United States Patent
Sethumadhavan et al.

(10) Patent No.: US 11,947,663 B2
(45) Date of Patent: Apr. 2, 2024

(54) CONTROL FLOW PROTECTION BASED ON PHANTOM ADDRESSING

(71) Applicant: The Trustees of Columbia University in the City of New York, New York, NY (US)

(72) Inventors: Lakshminarasimhan Sethumadhavan, Niskayuna, NY (US); Miguel Arroyo, New York, NY (US); Mohamed Tarek Bnziad Mohamed Hassan, New York, NY (US); Evgeny Manzhosov, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 188 days.

(21) Appl. No.: 17/030,785

(22) Filed: Sep. 24, 2020

(65) Prior Publication Data
US 2022/0019657 A1    Jan. 20, 2022

Related U.S. Application Data

(60) Provisional application No. 62/904,887, filed on Sep. 24, 2019.

(51) Int. Cl.
*G06F 21/54* (2013.01)
*G06F 21/53* (2013.01)

(52) U.S. Cl.
CPC .............. *G06F 21/54* (2013.01); *G06F 21/53* (2013.01); *G06F 2221/2135* (2013.01)

(58) Field of Classification Search
CPC ... G06F 21/54; G06F 21/53; G06F 2221/2135
See application file for complete search history.

(56) References Cited

U.S. PATENT DOCUMENTS 8,706,914 B2    4/2014 Duchesneau
9,634,995 B2    4/2017 Binder
(Continued)

FOREIGN PATENT DOCUMENTS

CN    105022956 A    11/2015
CN    105224864 A    1/2016

OTHER PUBLICATIONS

Control-Flow Security William Patrick Arthur (Year: 2016).*
(Continued)

*Primary Examiner* — Shin-Hon (Eric) Chen
*Assistant Examiner* — Thomas A Carnes
(74) *Attorney, Agent, or Firm* — Potomac Law Group, PLLC

(57) ABSTRACT

Disclosed are methods, systems, devices, media, circuits, and other implementations, including a method that includes generating for a code block of a process executing on a controller-based device one or more code block copies defined in a virtual address space of the controller-based device, with the code block of the process being stored in a particular segment of a physical address space of the controller-based device, and with the code block configured to separately map to each of the one or more of the code block copies in the virtual address space. The method further includes processing at least a portion of one of the one or more code block copies defined in the virtual address space when the corresponding code block of the process is to be processed.

17 Claims, 11 Drawing Sheets

(56) References Cited

U.S. PATENT DOCUMENTS

| | | | |
|---|---|---|---|
| 10,936,713 B2* | 3/2021 | Dehon | G06F 21/52 |
| 11,144,631 B2* | 10/2021 | Semeria | G06F 21/44 |
| 2017/0177368 A1* | 6/2017 | DeHon | G06F 21/6218 |
| 2017/0213039 A1* | 7/2017 | Werner | G06F 12/145 |
| 2017/0357808 A1 | 12/2017 | Arroyo et al. | |
| 2018/0211046 A1* | 7/2018 | Muttik | G06F 9/30058 |
| 2019/0004972 A1* | 1/2019 | Bear | G06F 12/145 |
| 2020/0210070 A1* | 7/2020 | Durham | G06F 3/0679 |

OTHER PUBLICATIONS

Shacham H., "The Geometry of Innocent Flesh on the Bone: Return-into-libc without Function Calls (on the x86)", Proceedings of the 14th ACM conference on Computer and communications security <https://dl.acm.org/citation.cfm?d=1315313>, pp. 552-561, 2007.

Buchanan E, Roemer R, Shacham H, Savage S., "When good instructions go bad: generalizing return-oriented programming to RISC", Proceedings of the 15th ACM conference on Computer and communications security <https://dl.acm.org/citation.cfm?id=1455776>, pp. 27-38, Oct. 2008.

Evtyushkin D, Ponomarev D, Abu-Ghazaleh N., "Jump over ASLR: attacking branch predictors to bypass ASLR", 49th International Symposium on Microarchitecture (Micro) <https://dl.acm.org/citation.cfm?id=3195686>, Oct. 2016.

Davi L, Liebchen C, Sadeghi AR, Snow KZ, Monrose F., "Isomeron: Code Randomization Resilient to (Just-In-Time) Return-Oriented Programming", NDSS Symposium <https://www.ndss-symposium.org/ndss2017/ndss-2017-programme/aslrcache-practical-cache-attacks-mmu/> Feb. 2017.

Gras B, Razavi K, Bosman E, Box H, Giuffrida C., "ASLR on the Line: Practical Cache Attacks on the MMU", NDSS Symposium <https://www.ndss-symposium.org/ndss2017/ndss-2017-programme/aslrcache-practical-cache-attacks-mmu/> Feb. 2017.

"Improving N-Variant Systems Using Phantom Address Spaces," Micro 2019 Submission #1228.

"Ios developer library," https://developer.apple.com/library/archive/qa/qa1788/_index.html, [Online; accessed Apr. 5, 2019].

Android, "Security enhancements in android 5.0," https://source.android.com/security/enhancements/enhancements50, [Online; accessed Apr. 5, 2019].

Arm, "Arm cortex-A32 core technical reference manual, r0p1," https://static.docs.arm.com/100241/0001/cortex_a32_trm_100241_0001_00_en.pdf, Feb. 2017.

Arm, "Arm cortex-A76 core technical reference manual, r3p0," https://static.docs.arm.com/100798/0300/cortex_a76_trm_100798_0300_00_en.pdf, Jul. 2018.

E. D. Berger and B. G. Zorn, "Diehard: Probabilistic memory safety for unsafe languages," in Proceedings of the 27th ACM SIGPLAN Conference on Programming Language Design and Implementation, ser. PLDI '06, Ottawa, Ontario, Canada, 2006, pp. 158-168.

N. Binkert, B. Beckmann, G. Black, S. K. Reinhardt, A. Saidi, A. Basu, J. Hestness, D. R. Hower, T. Krishna, S. Sardashti, R. Sen, K. Sewell, M. Shoaib, N. Vaish, M. D. Hill, and D. A. Wood, "The Gem5 simulator," SIGARCH Computer Architecture News, 2011.

D. Bounov, R. Gokhan Kici, and S. Lerner, "Protecting C++ dynamic dispatch through VTable interleaving," in Proceedings of the 2016 Network and Distributed System Security (NDSS) Symposium, San Diego, CA, USA, Feb. 2016.

N. Burow, S. A. Carr, J. Nash, P. Larsen, M. Franz, S. Brunthaler, and M. Payer, "Control-Flow Integrity: Precision, Security, and Performance," ACM Computing Surveys (CSUR), vol. 50, No. 1, p. 16, 2017.

N. Burow, D. McKee, S. A. Carr, and M. Payer, "CFIXX: Object type integrity for C++ virtual dispatch," in Proceedings of the 2018 Network and Distributed System Security (NDSS) Symposium, San Diego, CA, USA, Feb. 2018.

N. Carlini, A. Barresi, M. Payer, D. Wagner, and T. R. Gross, "Control-Flow Bending: On the Effectiveness of Control-Flow Integrity," in Proc. of USENIX Sec, 2015, pp. 161-176.

N. Carlini and D. Wagner, "ROP is Still Dangerous: Breaking Modern Defenses," in Proc. of USENIX Sec, 2014, pp. 385-399.

Y. Cheng, Z. Zhou, M. Yu, X. Ding, and R. H. Deng, "Ropecker: A generic and practical approach for defending against ROP attacks," in Proceedings of the 2014 Network and Distributed System Security (NDSS) Symposium, San Diego, CA, USA, Feb. 2014.

B. Cox, D. Evans, A. Filipi, J. Rowanhill, W. Hu, J. Davidson, J. Knight, A. Nguyen-Tuong, and J. Hiser, "N-variant systems: A secretless framework for security through diversity," in Proceedings of the 15th Conference on USENIX Security Symposium—vol. 15, ser. USENIX-SS'06, Vancouver, B.C., Canada, 2006.

L. Davi, A. Dmitrienko, A.-R. Sadeghi, and M. Winandy, "Return-oriented programming without returns on ARM," System Security Lab, Ruhr University, Bochum, Germany, Tech. Rep. HGI-TR-2010-002, Dec. 2010. [Online]. Available: https://www.ei.ruhr-uni-bochum.de/media/trust/veroeffentlichungen/2010/07/21/ROP-without-Returns-on-ARM.pdf.

L. Davi, A.-R. Sadeghi, D. Lehmann, and F. Monrose, "Stitching the Gadgets: On the Ineffectiveness of Coarse-Grained Control-Flow Integrity Protection," in Proc. of USENIX Sec, 2014, pp. 401-416.

I. Evans, S. Fingeret, J. Gonzalez, U. Otgonbaatar, T. Tang, H. Shrobe, S. Sidiroglou-Douskos, M. Rinard, and H. Okhravi, "Missing the point (er): On the effectiveness of code pointer integrity," in 2015 IEEE Symposium on Security and Privacy. IEEE, 2015, pp. 781-796.

I. Evans, F. Long, U. Otgonbaatar, H. Shrobe, M. Rinard, H. Okhravi, and S. Sidiroglou-Douskos, "Control Jujutsu: On the Weaknesses of Fine-Grained Control Flow Integrity," in Proc. of ACM CCS, 2015, pp. 901-913.

R. Gawlik, P. Koppe, B. Kollenda, A. Pawlowski, B. Garmany, and T. Holz, "Detile: Fine-grained information leak detection in script engines," in Proceedings of the 13th International Conference on Detection of Intrusions and Malware, and Vulnerability Assessment—vol. 9721, ser. DIMVA 2016, San Sebastian, Spain, 2016, pp. 322-342.

E. Göktas, E. Athanasopoulos, H. Bos, and G. Portokalidis, "Out of Control: Overcoming Control-Flow Integrity," in 2014 IEEE Symposium on Security and Privacy. IEEE, 2014, pp. 575-589.

E. Göktas, E. Athanasopoulos, M. Polychronakis, H. Bos, and G. Portokalidis, "Size Does Matter: Why Using Gadget-Chain Length to Prevent Code-Reuse Attacks is Hard," in Proc. of USENIX Sec, 2014, pp. 417-432.

D. Ha, W. Jin, and H. Oh, "REPICA: Rewriting position independent code of ARM," IEEE Access, vol. 6, pp. 50 488-50 509, 2018.

W. He, S. Das, W. Zhang, and Y. Liu, "No-jump-into-basic-block: Enforce basic block CFI on the fly for real-world binaries," in Proceedings of the 54th Annual Design Automation Conference 2017, ser. DAC '17, Austin, TX, USA, 2017, p. 23:1-23:6.

J. Hiser, A. Nguyen-Tuong, M. Co, M. Hall, and J. W. Davidson, "Ilr: Where'd my gadgets go?" in 2012 IEEE Symposium on Security and Privacy, May 2012, pp. 571-585.

Intel, "Intel control-flow enforcement technology preview,"https://software.intel.com/sites/default/files/managed/4d/2a/controlflow-enforcement-technology-preview.pdf, 2017, [Online; accessed Apr. 5, 2019].

Intel Corporation, InteIR Memory Protection Extensions Enabling Guide, Jan. 2016.

T. Kim, C. H. Kim, H. Choi, Y. Kwon, B. Saltaformaggio, X. Zhang, and D. Xu, "RevARM: A platform-agnostic ARM binary rewriter for security applications," in Proceedings of the 33rd Annual Computer Security Applications Conference, ser. ACSAC 2017, Orlando, FL, USA, 2017, pp. 412-424.

V. Kuznetsov, L. Szekeres, M. Payer, G. Candea, R. Sekar, and D. Song, "Code-pointer integrity," in 11th fUSENIXg Symposium on Operating Systems Design and Implementation (fOSDIg 14), 2014, pp. 147-163.

Y. Kwon, D. Kim, W. N. Sumner, K. Kim, B. Saltaformaggio, X. Zhang, and D. Xu, "Ldx: Causality inference by lightweight dual execution," in Proceedings of the Twenty-First International Con-

(56) References Cited

OTHER PUBLICATIONS ference on Architectural Support for Programming Languages and Operating Systems, ser. ASPLOS '16, Atlanta, Georgia, USA, 2016, pp. 503-515.

P. Larsen, A. Homescu, S. Brunthaler, and M. Franz, "Sok: Automated software diversity," in 2014 IEEE Symposium on Security and Privacy. IEEE, 2014, pp. 276-291.

Y. Lee and G. Lee, "Detecting code reuse attacks with branch prediction," Computer, vol. 51, No. 4, pp. 40-47, Apr. 2018.

A. J. Mashtizadeh, A. Bittau, D. Boneh, and D. Mazières, "CCFI: Cryptographically enforced control flow integrity," in Proceedings of the 22d ACM SIGSAC Conference on Computer and Communications Security, ser. CCS '15, Denver, Colorado, USA, 2015, pp. 941-951.

S. Nagarakatte, J. Zhao, M. M. Martin, and S. Zdancewic, "Softbound: Highly compatible and complete spatial memory safety for c," ACM Sigplan Notices, vol. 44, No. 6, pp. 245-258, 2009.

S. Nagarakatte, J. Zhao, M. M. Martin, and S. Zdancewic, "Cets: compiler enforced temporal safety for c," in ACM Sigplan Notices, vol. 45, No. 8. ACM, 2010, pp. 31-40.

Nergal, "The advanced return-into-lib(c) exploits: Pax case study," http://phrack.org/issues/58/4.html, 2001, [Online; accessed Apr. 5, 2019].

N. Nethercote, "Dynamic binary analysis and instrumentation," Ph.D. dissertation, University of Cambridge, Jul. 2004.

Oracle, "Hardware-assisted checking using silicon secured memory (ssm)," https://docs.oracle.com/cd/E37069_01/html/E37085/gphwb.html, 2015.

V. Pappas, M. Polychronakis, and A. D. Keromytis, "Smashing the gadgets: Hindering return-oriented programming using in-place code randomization," in 2012 IEEE Symposium on Security and Privacy, May 2012, pp. 601-615.

E. J. Schwartz, T. Avgerinos, and D. Brumley, "Q: Exploit hardening made easy," in Proceedings of the 20th USENIX Conference on Security, ser. SEC'11, San Francisco, CA, USA, 2011, pp. 25-25.

K. Z. Snow, F. Monrose, L. Davi, A. Dmitrienko, C. Liebchen, and A. Sadeghi, "Just-in-time code reuse: On the effectiveness of fine-grained address space layout randomization," in 2013 IEEE Symposium on Security and Privacy, Berkeley, CA, USA, May 2013, pp. 574-588.

V. van der Veen, D. Andriesse, M. Stamatogiannakis, X. Chen, H. Bos, and C. Giuffrdia, "The dynamics of innocent flesh on the bone: Code reuse ten years later," in Proceedings of the 2017 ACM SIGSAC Conference on Computer and Communications Security. ACM, 2017, pp. 1675-1689.

S. Volckaert, B. Coppens, and B. De Sutter, "Cloning your gadgets: Complete rop attack immunity with multi-variant execution," IEEE Transactions on Dependable and Secure Computing, vol. 13, No. 4, pp. 437-450, Jul. 2016.

D. Williams-King, G. Gobieski, K. Williams-King, J. P. Blake, X. Yuan, P. Colp, M. Zheng, V. P. Kemerlis, J. Yang, and W. Aiello, "Shuffler: Fast and deployable continuous code re-randomization," in 12th USENIX Symposium on Operating Systems Design and Implementation (OSDI 16). Savannah, GA, USA: Usenix Association, 2016, pp. 367-382.

Laszlo Szekeres, Mathias Payer, Tao Wei, and Dawn Song. SoK: Eternal war in memory. In Proceedings of the 2013 IEEE Symposium on Security and Privacy, S&P '13, pp. 48-62, San Francisco, CA, USA, 2013.

Santosh Nagarakatte, Jianzhou Zhao, Milo MK Martin, and Steve Zdancewic. SoftBound: Highly compatible and complete spatial memory safety for C. In Proceedings of the 30th ACM SIGPLAN Conference on Programming Language Design and Implementation, PLDI '09, pp. 245-258, Dublin, Ireland, 2009.

E. Göktas, R. Gawlik, B. Kollenda, E. Athanasopoulos, G. Portokalidis, C. Giuffrida, and H. Bos, "Undermining information hiding (and what to do about it)," in Proceedings of the 25th USENIX Security Symposium (USENIX Security 16), Austin, TX, Aug. 2016, pp. 105-119.

K. K. Ispoglou, B. AlBassam, T. Jaeger, and M. Payer, "Block oriented programming: Automating data-only attacks," in Proceedings of the 2018 ACM SIGSAC Conference on Computer and Communications Security, ser. CCS '18, Toronto, Canada, 2018, pp. 1868-1882.

G. S. Kc, A. D. Keromytis, and V. Prevelakis, "Countering codeinjection attacks with instruction-set randomization," in Proceedings of the 10th ACM Conference on Computer and Communications Security, ser. CCS '03, Washington D. C., USA, 2003, pp. 272-280.

L.-S. Kim and R. W. Dutton, "Metastability of CMOS latch/flipflop," IEEE Journal of Solid-State Circuits, vol. 25, No. 4, pp. 942-951, Aug. 1990.

K. Koning, H. Bos, and C. Giuffrida, "Secure and efficient multivariant execution using hardware-assisted process virtualization," in Proceedings of the 2016 46th Annual IEEE/IFIP International Conference on Dependable Systems and Networks, ser. DSN '16, Jun. 2016, pp. 431-442.

A. Kwon, U. Dhawan, J. M. Smith, T. F. Knight, Jr., and A. DeHon, "Low-fat pointers: Compact encoding and efficient gate-level implementation of fat pointers for spatial safety and capability-based security," in Proceedings of the 2013 ACM SIGSAC Conference on Computer & Communications Security, ser. CCS '13, Berlin, Germany, 2013, pp. 721-732.

LLVM, "Control flow integrity design," https://clang.llvm.org/docs/ControlFlowIntegrityDesign.html, [Online; accessed Jun. 15, 2020].

M. E. Locasto, S. Sidiroglou, and A. D. Keromytis, "Application communities: Using monoculture for dependability," in Proceedings of the First Conference on Hot Topics in System Dependability, ser. HotDep05. Yokohama, Japan: USENIX Association, 2005, p. 9.

K. Lu, M. Xu, C. Song, T. Kim, and W. Lee, "Stopping memory disclosures via diversification and replicated execution," IEEE Transactions on Dependable and Secure Computing, 2018.

Musl, "musl libc," http://www.musl-libc.org/, [Online; accessed Jun. 15, 2020].

T. Nyman, J.-E. Ekberg, L. Davi, and N. Asokan, "CFI CaRE: Hardware-supported call and return enforcement for commercial microcontrollers," in Research in Attacks, Intrusions, and Defenses. Springer International Publishing, 2017, pp. 259-284.

A. Papadogiannakis, L. Loutsis, V. Papaefstathiou, and S. Ioannidis, "ASIST: Architectural support for instruction set randomization," in Proceedings of the 2013 ACM SIGSAC Conference on Computer and Communications Security, ser. CCS '13, Berlin, Germany, 2013, pp. 981-992.

H. Sasaki, M. A. Arroyo, M. T. I. Ziad, K. Bhat, K. Sinha, and S. Sethumadhavan, "Practical byte-granular memory blacklisting using Califorms," in Proceedings of the 52nd Annual IEEE/ACM International Symposium on Microarchitecture, ser. Micro '52, Columbus, OH, USA, 2019, pp. 558-571.

K. Sinha, V. P. Kemerlis, and S. Sethumadhavan, "Reviving instruction set randomization," in Proceedings of the 2017 IEEE International Symposium on Hardware Oriented Security and Trust (HOST), 2017, pp. 21-28.

K. Sinha and S. Sethumadhavan, "Practical memory safety with REST," in Proceedings of the 45th Annual International Symposium on Computer Architecture, ser. ISCA '18, Los Angeles, California, USA, 2018, pp. 600-611.

Solar Designer, "Getting around non-executable stack (and fix)," http://seclists.org/bugtraq/1997/Aug/63, Aug. 1997.

Statista and I. Insights, "Microcontroller unit (mcu) shipments worldwide from 2015 to 2023." https://www.statista.com/statistics/935382/worldwide-microcontroller-unit-shipments/, 2019, [Online; accessed Jun. 15, 2020].

N. Tuck, B. Calder, and G. Varghese, "Hardware and binary modification support for code pointer protection from buffer overflow," in 37th International Symposium on Microarchitecture (Micro '04), Portland, OR, USA, 2004, pp. 209-220.

S. Volckaert, B. Coppens, A. Voulimeneas, A. Homescu, P. Larsen, B. De Sutter, and M. Franz, "Secure and efficient application monitoring and replication," in Proceedings of the 2016 USENIX Conference on Usenix Annual Technical Conference, ser. ATC '16, Denver, CO, USA, 2016, pp. 167-179.

R. N. M. Watson, J. Woodruff, P. G. Neumann, S. W. Moore, J. Anderson, D. Chisnall, N. H. Dave, B. Davis, K. Gudka, B. Laurie,

(56) References Cited

OTHER PUBLICATIONS

S. J. Murdoch, R. M. Norton, M. Roe, S. D. Son, and M. Vadera, "Cheri: A hybrid capability-system architecture for scalable software compartmentalization," in Proceedings of the 2015 IEEE Symposium on Security and Privacy, San Jose, CA, USA, May 2015, pp. 20-37.
D. Williams-King, H. Kobayashi, K. Williams-King, G. Patterson, F. Spano, Y. J. Wu, J. Yang, and V. P. Kemerlis, "Egalito: Layoutagnostic binary recompilation," in Proceedings of the Twenty-Fifth International Conference on Architectural Support for Programming Languages and Operating Systems, 2020, pp. 133-147.
Archibald Samuel Elliott, Andrew Ruef, Michael Hicks, and David Tarditi. Checked C: Making C safe by extension. In 2018 IEEE Cybersecurity Development, SecDev'18, pp. 53-60, Cambridge, MA, USA, Sep. 2018.
Tong Zhang, Dongyoon Lee, and Changhee Jung. BOGO: Buy spatial memory safety, get temporal memory safety (almost) free. In Proceedings of the Twenty-Fourth International Conference on Architectural Support for Programming Languages and Operating Systems, ASPLOS '19, pp. 631-644, Providence, RI, USA, Apr. 2019.
Oleksii Oleksenko, Dmitrii Kuvaiskii, Pramod Bhatotia, Pascal Felber, and Christof Fetzer. Intel MPX explained: A cross-layer analysis of the Intel MPX system stack. Proceedings of the ACM on Measurement and Analysis of Computing Systems, 2(2):28, 2018.
Nicholas Carlini, Antonio Barresi, Mathias Payer, David Wagner, and Thomas R. Gross. Control-flow bending: On the effectiveness of control-flow integrity. In Proceedings of the 24th USENIX Conference on Security Symposium, SEC 15, pp. 161-176, Washington, DC, USA, 2015.
Ali Jose Mashtizadeh, Andrea Bittau, Dan Boneh, and David Mazières. CCFI: Cryptographically enforced control flow integrity. In Proceedings of the 22nd ACM SIGSAC Conference on Computer and Communications Security, CCS 15, pp. 941-951, Denver, Colorado, USA, 2015.
Inc Qualcomm Technologies. Pointer authentication on ARMv8.3. https://www.qualcomm.com/media/documents/files/whitepaper-pointer-authentication-on-armv8-3.pdf, 2017.
Lucas Davi, Christopher Liebchen, Ahmad-Reza Sadeghi, Kevin Z. Snow, and Fabian Monrose. Isomeron: Code randomization resilient to (Just-In-Time) return-oriented programming. In Proceedings of the 2015 Network and Distributed System Security Symposium, NDSS '15, San Diego, CA, USA, Feb. 2015.
Arkaitz Ruiz-Alvarez and Kim Hazelwood. Evaluating the impact of dynamic binary translation systems on hardware cache performance. In Proceedings of the 2008 IEEE International Symposium on Workload Characterization, pp. 131-140, Sep. 2008.
Abraham A Clements, Naif Saleh Almakhdhub, Saurabh Bagchi, and Mathias Payer. ACES: Automatic compartments for embedded systems. In Proceedings of the 27th USENIX Conference on Security Symposium, SEC'18, pp. 65-82, Baltimore, MD, USA, 2018.
Abraham A Clements, Naif Saleh Almakhdhub, Khaled S Saab, Prashast Srivastava, Jinkyu Koo, Saurabh Bagchi, and Mathias Payer. Protecting bare-metal embedded systems with privilege overlays. In Proceedings of the 2017 IEEE Symposium on Security and Privacy, S&P '17, pp. 289-303, San Jose, CA, USA, 2017.
Ulrich Drepper. Security enhancements in redhat enterprise Linux (beside SELinux), 2004.
Stephen Checkoway, Lucas Davi, Alexandra Dmitrienko, Ahmad-Reza Sadeghi, Hovav Shacham, and Marcel Winandy. Return-oriented programming without returns. In Proceedings of the 17th ACM Conference on Computer and Communications Security, CCS '10, pp. 559-572, Chicago, Illinois, USA, 2010.
Ollie Whitehouse. An analysis of address space layout randomization on windows vista, Jan. 2007.
Jason Hiser, Anh Nguyen-Tuong, Michele Co, Matthew Hall, and Jack W. Davidson. ILR: Where'd my gadgets go? In Proceedings of the 2012 IEEE Symposium on Security and Privacy, S&P '12, pp. 571-585, May 2012.
Chongkyung Kil, Jinsuk Jun, Christopher Bookholt, Jun Xu, and Peng Ning. Address space layout permutation (ASLP): Towards fine-grained randomization of commodity software. In Proceedings of the 2006 22nd Annual Computer Security Applications Conference, ACSAC '06, pp. 339-348, Dec. 2006.
David Williams-King, Graham Gobieski, Kent Williams-King, James P. Blake, Xinhao Yuan, Patrick Colp, Michelle Zheng, Vasileios P. Kemerlis, Junfeng Yang, and William Aiello. Shuffler: Fast and deployable continuous code re-randomization. In Proceedings of the 12th USENIX Symposium on Operating Systems Design and Implementation, OSDI 16, pp. 367-382, Savannah, GA, USA, 2016. USENIX Association.
Xi Chen, Herbert Bos, and Cristiano Giuffrida. CodeArmor: Virtualizing the code space to counter disclosure attacks. In Proceedings of the 2017 IEEE European Symposium on Security and Privacy, Euro S&P '17, pp. 514-529, Paris, France, Apr. 2017.
Mark Gallagher, Lauren Biernacki, Shibo Chen, Zelalem Birhanu Aweke, Salessawi Ferede Yitbarek, Misiker Tadesse Aga, Austin Harris, Zhixing Xu, Baris Kasikci, Valeria Bertacco, Sharad Malik, Mohit Tiwari, and Todd Austin. Morpheus: A vulnerability-tolerant secure architecture based on ensembles of moving target defenses with churn. In Proceedings of the Twenty-Fourth International Conference on Architectural Support for Programming Languages and Operating Systems, ASPLOS '19, pp. 469-484, Providence, RI, USA, 2019.
Felix Schuster, Thomas Tendyck, Christopher Liebchen, Lucas Davi, Ahmad-Reza Sadeghi, and Thorsten Holz. Counterfeit object-oriented programming: On the difficulty of preventing code reuse attacks in C++ applications. In Proceedings of the 2015 IEEE Symposium on Security and Privacy, S&P '15, pp. 745-762, Oakland, CA, USA, 2015.
Yoongu Kim, Ross Daly, Jeremie Kim, Chris Fallin, Ji Hye Lee, Donghyuk Lee, Chris Wilkerson, Konrad Lai, and Onur Mutlu. Flipping bits in memory without accessing them: An experimental study of DRAM disturbance errors. In Proceeding of the 41st Annual International Symposium on Computer Architecture, ISCA '14, pp. 361-372, Minneapolis, Minnesota, USA, 2014.
Hong Hu, Shweta Shinde, Sendroiu Adrian, Zheng Leong Chua, Prateek Saxena, and Zhenkai Liang. Data-oriented programming: On the expressiveness of non-control data attacks. In Proceedings of the 2016 IEEE Symposium on Security and Privacy, S&P '16, pp. 969-986, San Jose, CA, USA, May 2016.
Ole-Johan Dahl, Edsger Wybe Dijkstra, and Charles Antony Richard Hoare, editors. Structured Programming. Academic Press Ltd., London, UK, 1972.
Chao Zhang, Scott A. Carr, Tongxin Li, Yu Ding, Chengyu Song, Mathias Payer, and Dawn Song. Vtrust: Regaining trust on virtual calls. In Proceedings of the 2016 Network and Distributed System Security Symposium, NDSS '16, San Diego, CA, USA, Feb. 2016.
Dimitar Bounov, Rami Gokhan Kici, and Sorin Lerner. Protecting C++ dynamic dispatch through VTable interleaving. In Proceedings of the 2016 Network and Distributed System Security Symposium, NDSS '16, San Diego, CA, USA, Feb. 2016.
Nathan Burow, Derrick McKee, Scott A. Carr, and Mathias Payer. CFIXX: Object type integrity for C++ virtual dispatch. In Proceedings of the 2018 Network and Distributed System Security Symposium, NDSS '18, San Diego, CA, USA, Feb. 2018.
Lee-Sup Kim and Robert W. Dutton. Metastability of CMOS latch/flipflop. IEEE Journal of Solid-State Circuits, 25 (4):942-951, Aug. 1990.
Nathan Burow, Xinping Zhang, and Mathias Payer. Sok: Shining light on shadow stacks. In Proceedings of the 2019 IEEE Symposium on Security and Privacy, S&P '19, May 2019.
James Bucek, Klaus-Dieter Lange, and Jóakim v. Kistowski. Spec CPU2017: Next-Generation Compute Benchmark. In Companion of the 2018 ACM/SPEC International Conference on Performance Engineering, ICPE '18, pp. 41-42, Berlin, Germany, 2018.
Musl libc. http://www.musl-libc.org/. [Online; accessed Aug. 16, 2019].
Taegyu Kim, Chung Hwan Kim, Hongjun Choi, Yonghwi Kwon, Brendan Saltaformaggio, Xiangyu Zhang, and Dongyan Xu. RevARM: A platform-agnostic ARM binary rewriter for security applications.

(56) References Cited

OTHER PUBLICATIONS

In Proceedings of the 33rd Annual Computer Security Applications Conference, ACSAC '17, pp. 412-424, Orlando, FL, USA, 2017.
Dongsoo Ha, Wenhui Jin, and Heekuck Oh. REPICA: Rewriting position independent code of ARM. IEEE Access, 6:50488-50509, 2018.
Roberto Avanzi. The Qarma block cipher family. almost MDS matrices over rings with zero divisors, nearly symmetric even-mansour constructions with non-involutory central rounds, and search heuristics for low-latency S-boxes. IACR Transactions on Symmetric Cryptology, 2017(1):4-44, Mar. 2017.
Hans Liljestrand, Thomas Nyman, Kui Wang, Carlos Chinea Perez, Jan-Erik Ekberg, and N. Asokan. PAC it up: Towards pointer integrity using ARM pointer authentication. In Proceedings of the 28th USENIX Security Symposium, (USENIX Security 19), pp. 177-194, Santa Clara, CA, USA, Aug. 2019.
Sascha Schirra. Ropper. https://github.com/sashs/Ropper. [Online; accessed Aug. 16, 2019].
John Wilander, Nick Nikiforakis, Yves Younan, Mariam Kamkar, and Wouter Joosen. RIPE: Runtime intrusion prevention evaluator. In Proceedings of the 27th Annual Computer Security Applications Conference, ACSAC '11, pp. 41-50, Orlando, Florida, USA, 2011.
Vedvyas Shanbhogue, Deepak Gupta, and Ravi Sahita. Security analysis of processor instruction set architecture for enforcing control-flow integrity. In Proceedings of the 8th International Workshop on Hardware and Architectural Support for Security and Privacy, HASP '19, Phoenix, AZ, USA, 2019.
M. Tarek Ibn Ziad, M. Arroyo, E. Manzhosov, V. P. Kemerlis, and S. Sethumadhavan "Using Name Confusion to Enhance Security", pp. 1-14, Aug. 26, 2020.
M. Abadi, M. Budiu, U. Erlingsson, and J. Ligatti, "Control-flow integrity," in Proceedings of the 12th ACM Conference on Computer and Communications Security, ser. CCS '05, Alexandria, VA, USA, 2005, pp. 340-353.
A. Bittau, A. Belay, A. Mashtizadeh, D. Mazi'eres, and D. Boneh, "Hacking blind," in Proceedings of the 2014 IEEE Symposium on Security and Privacy, ser. S&P '14, Washington, DC, USA, 2014, pp. 227-242.
T. Bletsch, X. Jiang, V. W. Freeh, and Z. Liang, "Jump-oriented programming: A new class of code-reuse attack," in Proceedings of the 6th ACM Symposium on Information, Computer and Communications Security, ser. ASIACCS '11, Hong Kong, China, 2011, pp. 30-40.
Bluespec, "Flute: 5-stage, in-order, piplined Risc-V CPU," https://github.com/bluespec/Flute, 2019, [Online; accessed Jun. 15, 2020].
D. Bovet and M. Cesati, Understanding the Linux Kernel, Second Edition, 2nd ed., A. Oram, Ed. Sebastopol, CA, USA: O'Reilly & Associates, Inc., 2002.
C. Cowan, C. Pu, D. Maier, J. Walpole, P. Bakke, S. Beattie, A. Grier, P. Wagle, Q. Zhang, and H. Hinton, "Stackguard: Automatic adaptive detection and prevention of buffer-overflow attacks." in USENIX security symposium, vol. 98, 1998, pp. 63-78.
C. Cowan, S. Beattie, J. Johansen, and P. Wagle, "Pointguard: Protecting pointers from buffer overflow vulnerabilities," In Proceedings of the 12th Conference on USENIX Security Symposium—vol. 12, ser. SSYM '03, Washington, DC. USA, 2003, p. 7.
O.-J. Dahl, E. W. Dijkstra, and C. A. R. Hoare, Eds., Structured Programming. London, UK: Academic Press Ltd., 1972.
L. V. Davi, A. Dmitrienko, S. Nurnberger, and A.-R. Sadeghi, "Gadge me if you can: Secure and efficient ad-hoc instruction-level randomization for x86 and ARM," in Proceedings of the 8th ACM SIGSAC Symposium on Information, Computer and Communications Security, ser. Asia CCS '13, Hangzhou, China, 2013, pp. 299-310.
Exploit Database, "Apache 2.4.7 + php 7.0.2—openssl seal() uninitialized memory code execution," https://www.exploit-db.com/exploits/ 40142, [Online; accessed Jun. 15, 2020].
"Mcrypt 2.5.8—local stack overflow," https://www.exploit-db.com/exploits/22928, [Online; accessed Jun. 15, 2020].
"Netperf 2.6.0—stack-based buffer overflow," https://www.exploit-db.com/exploits/46997, [Online; accessed Jun. 15, 2020].
"Nginx 1.3.9 | 1.4.0—chuncked encoding stack buffer overflow," https://www.exploit-db.com/exploits/25775, [Online; accessed Jun. 15, 2020].

* cited by examiner

CONTROL FLOW PROTECTION BASED ON PHANTOM ADDRESSING

CROSS-REFERENCE TO RELATED APPLICATIONS

This application claims priority to, and the benefit of, U.S. Provisional Application No. 62/904,887, entitled "CONTROL FLOW PROTECTION BASED ON PHANTOM ADDRESSING" and filed Sep. 24, 2019, the content of which is incorporated herein by reference in its entirety.

STATEMENT REGARDING FEDERALLY SPONSORED RESEARCH

This invention was made with government support under grants N00014-17-1-2010 and HR0011-18-C-0017 awarded by the Office of Naval Research. The government has certain rights in the invention.

BACKGROUND

Code-reuse attacks continue to pose a significant threat to systems security, from resource constrained environments to data-centers. Attacks that chain together gadgets (short sequences of instructions) whose last instruction is a 'ret' are known as return-oriented programming (ROP) attacks. To mount a ROP attack, an attacker has to first analyze the code to identify the respective gadgets, which are sequences of instructions in the victim program (including any linked-in libraries) that end with a return. Second, the attacker uses a memory corruption vulnerability to inject a sequence of return addresses corresponding to a sequence of gadgets. When the function returns, it returns to the location of the first gadget. As that gadget terminates with a return, the return address is that of the next gadget, and so on. As ROP executes legitimate instructions belonging to the program, it is not inhibited by WAX (Write xor Execute, which is a memory protection scheme). It is to be noted that variants of ROP that use indirect 'jmp' or call instructions, instead of 'ret', to chain the execution of small instruction sequences together also exist, dubbed jump-oriented programming (JOP) and call-oriented programming (COP), respectively.

A mitigation technique against ROP/JOP/COP, and other CRA variants, is address space layout randomization (ASLR). ASLR randomizes the base addresses of code and data segments, thereby randomizing the start addresses of each gadget that the attacker attempts to invoke. Attackers, however, can exploit a memory corruption vulnerability to disclose the code layout (e.g., via a function pointer) and rewrite the code-reuse payload accordingly. This would bypass ASLR since only the base address of a segment is randomized. Disadvantageously, current mitigation techniques suffer from significant performance and energy overheads especially in the embedded domain.

SUMMARY

The present approaches and techniques implement phantom addressing schemes to thwart attacks, such as code-reuse attacks. Virtual memory addresses serve as references, or names/aliases, to objects (i.e., instructions, data) during computation. For instance, every instruction in a program is uniquely identified (at run time) with a virtual memory address (indicated by the value in the Program Counter (PC)). Typically, the virtual memory address assigned to an instruction is kept constant and unique for the lifetime of the program. The present disclosure shows that having multiple names/aliases for an instruction, or a block of instructions, at any given time instant, improves the security of the system with minimal hardware support without performance degradation. This improved security strategy is achieved by giving an instruction (or a block of instruction) multiple names or identities, and defining a security protocol that specifies a random sequence of names to be used during execution. If the attacker does not follow the security protocol by supplying an incorrect name, the exploited program will crash. In other words, if there are N addresses (names) per instruction (or instruction block), and if the attacker has to reuse P instruction sequences to complete an attack, the probability of detecting the attack is $1-(1/N)^P$, without any false positives. For example, for N=256 and P=5, the probability of an attack succeeding is 1 in 1 trillion. This kind of protection makes this technique suitable to be used as a standalone solution, or in tandem with other, heavier-weight hardening mechanisms. Such a class of architectures is referred to as Name Confusion Architectures (or alternatively referred to as phantom address/name architectures).

The name confusion approach is different from other hardening paradigms. For example, in the information-hiding paradigm, the program addresses (or parts of them) are kept a secret, but there is only one name per instruction. Similarly, Instruction Set Randomization (ISR) techniques randomize the encoding of instructions in memory while also maintaining a unique instruction name per program execution. In the metadata-based paradigm, such as Control-Flow Integrity (CFI), the set of targets (names) that can result from the execution of certain instructions (i.e., indirect branches) are computed statically and checked during execution. In moving target paradigms, such as Shuffler and Morpheus, the names of instructions change over time; however, at any given time, there is only one valid name/address for an instruction.

In the approaches described herein, a name confusion-based architecture is implemented to mitigate the code-reuse class of attacks (e.g., ROP, JOP, COP), including their just-in-time variants. The architecture considered, referred to as a Phantom Name System (PNS), provides up to N different names, for any instruction (or blocks of instructions), at any given time, where N is a configurable parameter (e.g., N is set to 256 in some embodiments). The security protocol for PNS implements a random selection among the different names. PNS works as follows: during instruction fetch, the address used to fetch the instruction is randomly chosen from one of the N possible names for the instruction, and the instruction is retrieved from that address. From that point on, any PC-relative addresses used by the program relies on the name obtained during fetch. If the attacker's strategy causes any of the PC-relative addresses to be different from the one used during the fetch, then an invalid instruction will be executed, leading to unexpected effects, such as an alignment, or instruction-decoding, exception. These unexpected effects lead to program crashes that can work as signals of bad actions taking place especially in the case of repeated crashes. Orthogonal mechanisms that turn these signals into a defensive advantage exist.

A naive implementation of PNS would require each instruction to be stored in N locations so they will have N names. Consequently, the capacity of all PC-indexed microarchitectural structures would be divided by N, heavily impacting performance. Further, this would require changes to the compiler, linker, loader, etc. In the approaches proposed herein, the use of multiple names/identities relies on the idea the different instruction names/addresses are intentionally aliased so they point to the same instruction, allowing the use of N instructions/variants from one copy. This idea is similar to how multiple virtual addresses can point to the same physical addresses (e.g., used to implement copy-on-write) with two key differences: first, in PNS the N names correspond to virtual addresses, not a physical address. Second, the PNS addresses do not need to be page-aligned as required for data synonyms, i.e., PNS virtual address names can be arbitrarily offset. The first difference ensures that PNS can be handled at the application level without requiring significant changes to the operating system (OS), which manages the virtual-to-physical address mappings, while the second is key to providing security. With the above optimizations, ROP/JOP/COP attack protection is provided at almost no performance overhead and without any binary changes. Further, the scheme can be combined with previously known techniques that encrypt instruction addresses stored in the heap or the global data section(s), viz., function pointers, to provide robust security against even larger class of attacks, such as COOP. The combined protection scheme has 6% performance overhead, making it better than state-of-the-art commodity security solutions, and has the additional benefit of not requiring a 64-bit architecture. Supporting non-64-bit architectures is important as those architectures make up the majority of the computing devices that exist nowadays: in 2018, 11.75 million servers shipped worldwide vs. 28.1 billion 32-bit (or smaller) microcontrollers.

Thus, in some variations, a method is provided that includes generating for a code block of a process executing on a controller-based device one or more code block copies defined in a virtual address space of the controller-based device, with the code block of the process being stored in a particular segment of a physical address space of the controller-based device, and with the code block configured to separately map to each of the one or more of the code block copies in the virtual address space. The method further includes processing at least a portion of one of the one or more code block copies defined in the virtual address space when the corresponding code block of the process is to be processed.

Embodiments of the method may include at least some of the features described in the present disclosure, including one or more of the following features.

Generating the one or more code block copies may include generating for the code block of the process executing on a controller-based device a plurality of code variants defined in the virtual address space of the controller-based device, with the code block being configured to separately map to each of the plurality of the code variants in the virtual address space. Processing the at least the portion of one of the one or more code block copies may include selecting for execution one of the plurality of code variants when the corresponding code block of the process is to be processed.

Selecting for execution one of the plurality of code variants may include randomly selecting for execution the one of the plurality of code variants.

The method may further include updating a program counter of the controller-based device according to the randomly selected one of the plurality of code variants.

Updating the program counter of the controller-based device may include determining a base virtual address corresponding to the code block of the process stored in the particular segment of a physical address space, determining a phantom index identifying the randomly selected one of the plurality of code variants, and computing a program counter value for the program counter according to the determined base virtual address corresponding to the code block stored in the particular segment of the physical address space and based on the determined phantom index.

Generating the plurality of code variants may include determining for each code variant a respective shift value (δ) representing a relative shift of the location of the program instructions in the respective code variant compared to original locations of the original instructions of the code block, and defining the plurality of code variants in the virtual address space, with the first instruction of each variant located in the virtual address space at a corresponding virtual address space location computed according to a respective virtual address space offset (Δ), and the respective determined shift value S.

The method may further include processing the selected one of the plurality of variants, including computing a return address for the one of the plurality of code variants in the virtual address space, storing one value derived from the return address in a software-implemented return address stack, and storing another value derived from the return address in a hardware-based structure that is immutable to external writes.

The return address may include a lower address portion including the respective shift value, δ, and an upper address portion including a phantom index identifying the randomly selected one of the plurality of code variants. Storing the one value derived from the return address may include storing the lower address portion of the return address in the software-implemented return address stack, and storing the other value derived from the return address may include storing the upper address portion of the return address in a hardware-based secret domain stack (SDS) structure that is immutable to external writes.

Generating the plurality of code variants may include including for each variant from the plurality of code variants one or more padding instructions at corresponding one or more virtual address space locations.

Including for the each variant the one or more padding instructions at the corresponding one or more virtual address space locations may include adding to the each variant of the plurality of code variants a TRAP instruction at a respective pre-determined one or more relative locations from the start of the each variant of the plurality of variants, with the TRAP instruction being configured, when executed, to trigger a security exception event.

Including for the each variant the one or more instructions at the corresponding one or more virtual address space locations may include adding to the each variant of the plurality of code variants a no-operation (NOP) instruction at a respective pre-determined one or more relative locations from the start of the each variant of the plurality of code variants in the virtual address space.

The plurality of code variants may include at least two code variants, and the first of the at least two code variants may include a first NOP instruction at the beginning of the first of the at least two code variants. A second of the at least two code variants may include a second NOP instruction at the end of the second of the at least two code variants.

The method may further include storing the NOP instruction in the physical address space locations for the corresponding code block at least at one of, for example, immediately before a physical starting address location of the code block, and/or immediately following a physical end address location of the code block.

Selecting one of the plurality of code variants may include accessing the code block from the physical address space based on a portion of a virtual address for one of the plurality of code of variants, the portion being indicative of the physical address space location, with portions of the virtual address, indicating the virtual address space locations for the one of the plurality of code variants, being masked.

Processing at least a portion of one of the one or more code block copies may include encrypting one or more pointers resulting from indirect program execution branching decisions, and decrypting the one or more pointers in response to a call operation requiring content of the one or more pointers.

In some variations, a computing system is provided that includes one or more memory devices to implement a physical address space for the computing system, and a controller. The controller is configured to generate for a code block of a process executing on the computing system one or more code block copies defined in a virtual address space of the computing system, with the code block of the process being stored in a particular segment of the physical address space of the computing system, and with the code block configured to separately map to each of the one or more of the code block copies in the virtual address space, and to process at least a portion of one of the one or more code block copies defined in the virtual address space when the corresponding code block of the process is to be processed.

Embodiments of the computing system may include at least some of the features described in the present disclosure, including at least some of the features described above in relation to the method, as well as one or more of the following features.

The controller configured to generate the one or more code block copies may be configured to generate for the code block of the process executing on a computing system (the controller may be part of the computing system, e.g., part of a processor-based device) a plurality of code variants defined in the virtual address space of the computing system, and to separately map to each of the plurality of the code variants in the virtual address space. The computing system may further include a selector circuit (which may be part of the controller) to select for execution one of the plurality of code variants when the corresponding code block of the process is to be processed.

The selector circuit configured to select for execution one of the plurality of code variants may be configured to randomly select for execution the one of the plurality of code variants.

The computing system may further include a program counter, and the controller may further be configured to update the program counter according to the randomly selected one of the plurality of code variants.

The controller configured to generate the plurality of code variants may be configured to include for each variant from the plurality of code variants one or more padding instructions at corresponding one or more virtual address space locations.

In some variations, non-transitory computer readable media is provided, that includes computer instructions, executable on a processor-based device, to generate for a code block of a process executing on the processor-based device one or more code block copies defined in a virtual address space of the processor-based device, with the code block of the process being stored in a particular segment of a physical address space of the processor-based device, and with the code block configured to separately map to each of the one or more of the code block copies in the virtual address space, and to process at least a portion of one of the one or more code block copies defined in the virtual address space when the corresponding code block of the process is to be processed.

Embodiments of the computer readable media may include at least some of the features described in the present disclosure, including at least some of the features described above in relation to the method and to the computing system.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Disclosed are systems, methods, and other implementations (including hardware implementations, software implementation, or hybrid implementations) to mitigate, for example, code-reuse attacks based on phantom name systems (PNS) (also referred to as phantom address space, or PAS) approaches. Such implementations include generating for a code block of a process executing on a controller-based device one or more code block copies defined in a virtual address space of the controller-based device, with the code block of the process being stored in a particular segment of a physical address space of the controller-based device, and with the code block configured to separately map to each of the one or more of the code block copies in the virtual address space, and processing at least a portion of one of the one or more code block copies defined in the virtual address space when the corresponding code block of the process is processed.

generating for a code block of a process executing on a controller-based device one or more code variants for the code block defined in a virtual address space of the controller-based device, with the code block of the process being stored in a particular segment of a physical address space of the controller-based device, and with the code block configured to separately map to each of the one or more of the code variants in the virtual address space, and accessing at least a portion of one of the one or more code variants defined in the virtual address space when the corresponding code block of the process is processed.

Figure 1:
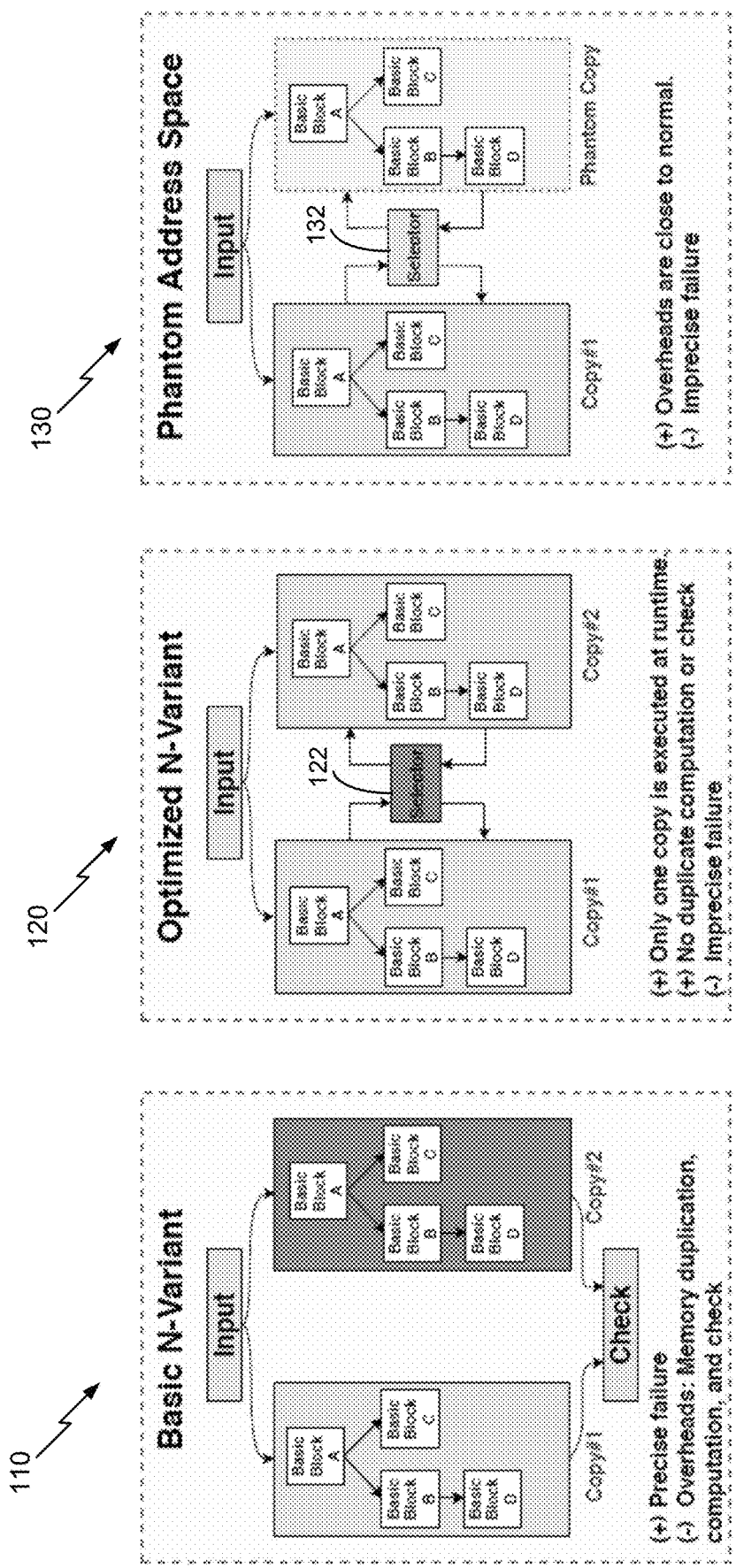
FIG. 1 includes diagrams comparing use of multi-variant implementations in physical space versus a phantom multi-variant approach in virtual address space.

To illustrate the concept implemented by the phantom addressing approaches described herein, reference is made to FIG. 1 showing the use of multi-variant implementations in physical space versus an implementation (based on some of the approaches described herein) of a phantom multi-variant approach in virtual address space. N-variant execution is a technique where automatically generated variants of a program are executed together to improve the security and reliability of a system. FIG. 1 shows a diagram of an example for 2-variant system 110 that executes two different copies of the program at the same time with the same set of inputs. The outputs of the two copies are compared by using a checker module, which raises an exception once a discrepancy is detected. Although N-variant provides a precise failure model (for example, in case of detecting an attack), it introduces significant memory and performance overheads. One way to optimize the N-variant systems is to add a selector component 122 that executes only one copy of the program at runtime, as shown in the N-Variant system 120 of FIG. 1. This optimization saves the computation power, yet suffers from the same memory overheads as the basic 2-variant one. Additionally, the optimized system only provides imprecise failure model. For instance, if the program crashes due to an attack, it is not possible to identify the exact point of failure. As will be detailed below, phantom address/name approach (also referred to as Phantom Address Space, or PAS, approach) can be used to eliminate the memory and performance overheads of N-variant systems. As noted, a central idea of Phantom Address Space (realized through Phantom Name Systems) is to use modifications to the addressing functions in order to generate a phantom copy of the program. This phantom copy does not exist in the physical program memory and therefore, memory overheads are mostly removed. A selector component 132 depicted in diagram 130 of FIG. 1 (showing a phantom address system operating on two program copies) orchestrates the control-flow of the program between the two copies. Thus, only one copy is executed at any given time, reducing the runtime overheads to be close to the normal execution time. Thus, in the phantom name/address system implementations, generating the one or more code variants includes generating for the code block of the process executing on a controller-based device a plurality of code variants defined in the virtual address space of the controller-based device, with the code block being configured to separately map to each of the plurality of the code variants in the virtual address space, and selecting for execution one of the plurality of code variants when the corresponding code block of the process is processed.

In Phantom name/address system (NPS) approaches, the phantom copies do not exist in the physical program memory and therefore, memory overheads are mostly removed. A selector component orchestrates the control-flow of the program between the N copies. In some example embodiments, the systems implemented use 2 code variants, i.e., N=2. Thus, only one copy of the 2-variant implementations is executed at any given time, reducing the runtime overheads to be close to the normal execution time.

To show the benefit of phantom-address-based approaches such as PNS, a defensive technique called Isomeron is studied as a way to protect against certain code-reuse attacks. This technique represents an optimized 2-variant system that executes code from two different isomers/variants to thwart the attacker's ability to guess the exact locations of the desired gadgets a priori. In some example implementations, the phantom-address-based systems achieve the same security goal by ensuring that the locations of the program instructions in the phantom copy is shifted by one instruction size compared to the same instruction location in the original program copy. Thus, performance overhead of Isomeron is reduced from 200% to nearly 0% over a vulnerable native execution. Phantom name system approaches can further be shown to allow efficient security protection for even resource constrained devices.

To implement the phantom name system approaches, phantom replicas of the program are created in virtual address space, and the execution among them is randomized. In order to do so, any transformation (satisfying certain conditions) can be used to switch between the replicas at run-time. For instance, one can use a linear transformation to map the memory layout into various sections of virtual address space, and use these replicas at run-time to randomize the execution. Generally, the transformation/mapping function, $f$, operates on an address (a) of a physical address (PA) space and maps it to addresses (va) of a virtual address (VA) space. This mapping creates phantoms for a given physical address space (in other words, an object, O, if mapped by $f$ to many phantoms $p_i$ in VA).

Figure 2:
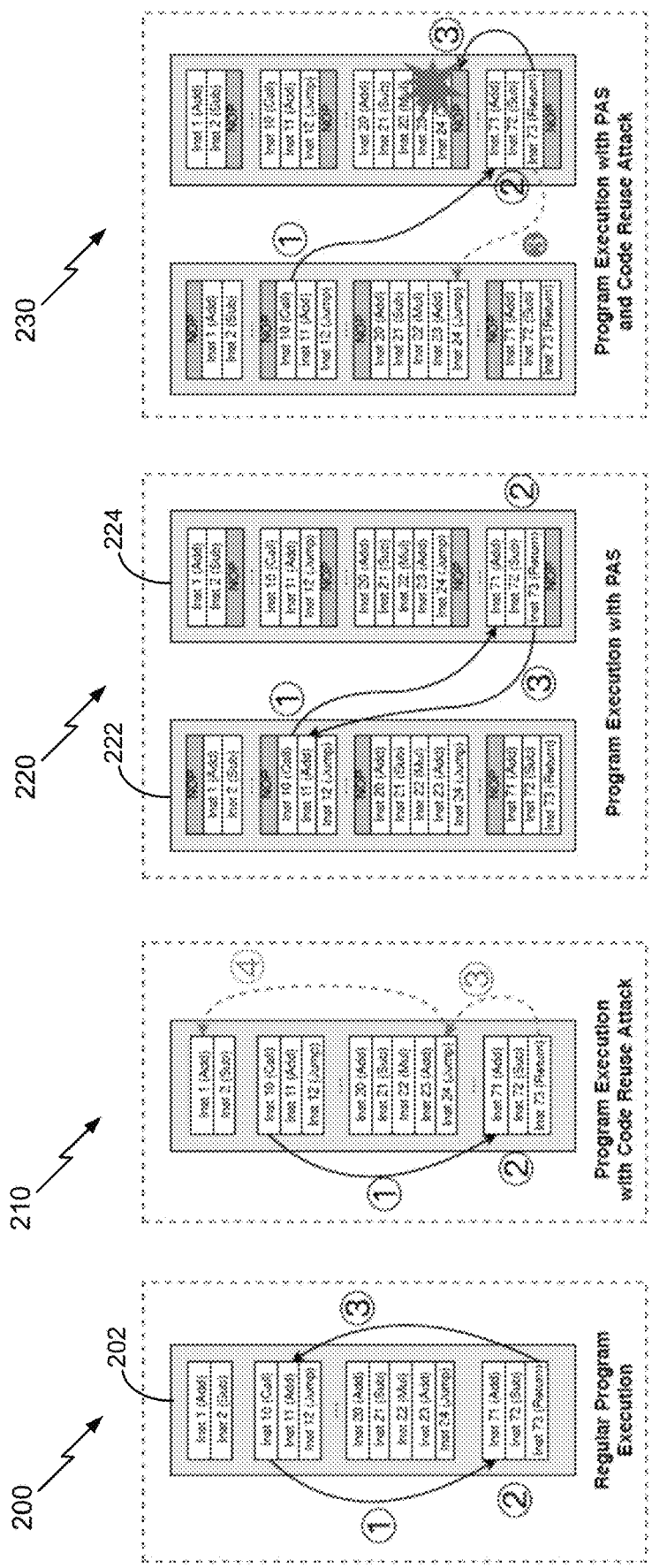
FIG. 2 includes diagrams illustrating conventional execution of a process, and execution based on an N-Variant phantom address (name) approach.

As noted, one major class of code-reuse attacks (or CRAs) is the return-oriented programming (ROP) attacks. Some of the approaches described herein mitigate ROP by ensuring that the addresses of the ROP gadgets in the gadget chain change after the chain is built. This will result in an undefined behavior of the payload (likely leading to a crash of the program). In an example of the phantom name (address) system approaches described herein, two copies of the program code are simultaneously available in virtual address (VA) space. One copy is the original program code, $C_O$, while the other is a phantom program variant, $C_P$. To successfully break the ROP gadget chain, the locations of the ROP gadgets in both copies should be different. While the program is executing, the phantom-address implementation continuously flips a coin to decide which copy of the program should be executed next. Since the gadget sets are completely different in each program copy, and it is not predictable which copy will execute at the time of exploitation, the adversary is unable to reliably construct a payload, even with full knowledge of all memory contents. A process based on an N-Variant phantom addressing (naming) approach is illustrated in FIG. 2(a) (d). FIG. 2 includes a diagram 200 showing a normal execution of a program 202, in which 'Inst 10' changes the control-flow of the program to a different BBL (starting with 'Inst 71'), while diagram 210 of FIG. 2 illustrates a successful code-reuse attack via ROP, in which the attacker uses a memory safety vulnerability to overwrite the return address stored on the stack and divert the control flow to Inst 24 upon executing the ret instruction. FIG. 2 further includes a diagram 220 showing a phantom name system diversified execution of a program 222 (that includes a phantom code 224). For simplicity, in the diagram 220 only two phantoms are shown, that use a security shift, δ, typically sized to one (1) instruction. Each control flow instruction can arbitrarily choose to change the execution domain or not. In the example of the diagram 220, the randomize operation decides to execute Inst 71 from the Phantom domain. As the attacker cannot predict this runtime decision in advance, the attacker provides the wrong gadget address on the stack (now shifted by δ). Thus, the attacker will end up executing a wrong instruction, as shown in diagram 230 of FIG. 2. This wrong instruction may belong to a different BBL or may divert the execution to a new undesired BBL. In general, if the attacker makes the wrong guess, it will execute one less (or one more) instruction compared to the desired gadget. If δ is smaller than the instruction size, the attacker will skip a portion of the instruction, resulting in an incorrect instruction decoding. In the example of the diagram 230 of FIG. the ROP attack is thwarted because the attack jumps to an address in the virtual address space that contains a no-operation (NOP) instruction. Further details about generating code variants that include added instructions, such as NOP or a TRAP instruction that can cause security exceptions (or program termination), are discussed in greater detail below.

Generally, any in-place code layout randomization approach can be used to generate $C_P$ code. However, using an aggressive randomization approach will cause performance overheads with almost no additional security (beyond changing the gadgets addresses in the two copies). In a first example implementation, a more efficient code layout randomization technique is adopted in which a single no-operation (NOP) instruction is inserted at the beginning of each code block (also referred to as a basic block, or BBL) in $C_O$ and another NOP instruction at the end of each BBL in $C_P$. Thus, the instruction offsets of any two twin BBL's (Isomers) are shifted by the size of the NOP instruction, while the BBLs themselves are aligned in the two program copies, $C_O$ and $C_P$, simplifying the hardware modifications.

In the example illustration of FIGS. 2(c) and 2(d), a software modification used for the example PNS implementation is the insertion of a NOP instruction at the beginning of each BBL. This NOP is mainly inserted for security reasons as it ensures that the ROP gadgets do not exist at the same location (address offset) in the two variants of the code. Thus, PAS neither requires access to source code of the target program nor re-compilation. It can be fully implemented using a binary re-writer, allowing it to protect legacy code. Its simplicity allows for practical implementations with small overheads in storage and execution time, especially for 32-bit MCUs.

Figure 3:
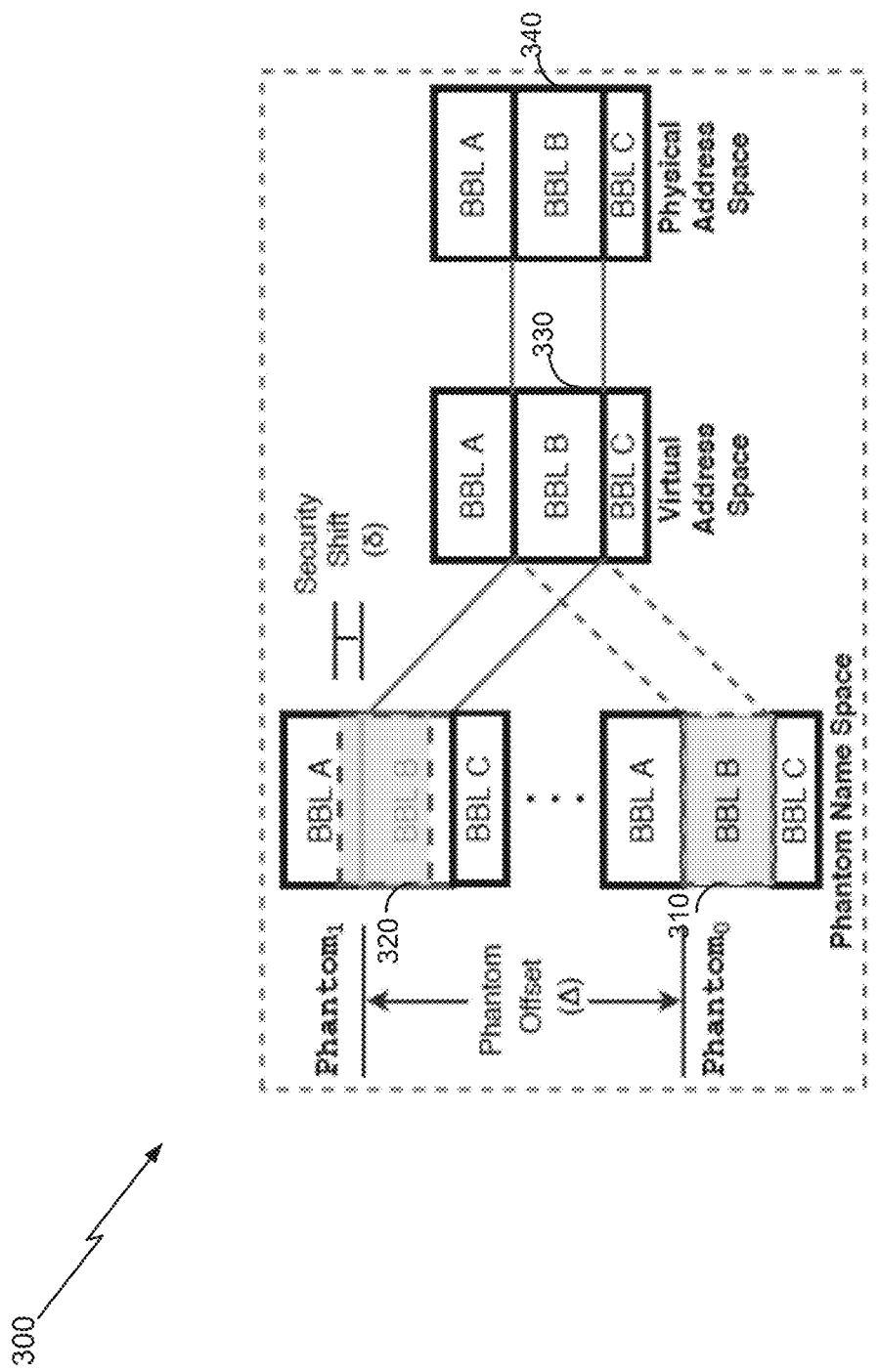
FIG. 3 is a diagram showing the general approach achieved through use of multi-phantom copies of a block of code.

Turning now to FIG. 3, a diagram 300 showing the general approach achieved through use of multi-phantom copies of a block of code is provided. As noted, a phantom address (phantom name) architecture assigns different addresses, or names, to any contiguous group of instructions (referred to as code blocks) randomly at runtime. PNS typically includes N phantoms (domains, or variants), which results in every instruction in a program to have N unique names (i.e., identities or addresses). To assign the names, a mapping function, e.g., $name_p = f(va, p)$, is used, which takes the instruction virtual address, va, and a phantom index, p as inputs and returns the phantom name, $name_p$. This way, any instruction is mapped by $f$ to unique location in each of the N phantoms. The function $f$ does not have to be kept a secret, as security is purely derived from the random selection of p at fetch time. For mapping a phantom name to its original virtual address, an inverse function, $va = f^{-1}$ ($name_p$), is used. To implement the inverse function, the phantom name needs to encode the phantom index, p as part of the phantom address.

There are four main operations that are realized in a PNS: Populate, Randomize, Resolve, and Conceal. With respect to the populate operational component, the PNS creates multiple phantoms of basic blocks, and populates them in the phantom name space. The diagram 300 of FIG. 3 shows BBL's duplicated in virtual address space. In this example, a program is associated with two phantoms variants, such that every basic block (BBL) has two different names (addresses) that include $Phantom_0$ (aka the original domain, corresponding to the phantom space 310) and $Phantom_1$ (corresponding to the space 320). PNS separates the two phantoms by a phantom offset, Δ, in the phantom space. To add discrepancy between the phantom copies, in some embodiments, a minor security shift, δ, may be introduced so that the phantom variants are not perfectly overlapped after removing the offset Δ. This additional discrepancy, δ, enhances security, as will be discussed in greater detail below. In some embodiments, the inverse mapping function $f^{-1}$ maps all phantoms to a single name in the virtual address space (corresponding to the block 330), which is then translated to a physical address (corresponding to the space 340) by the OS. Different approaches can be used to populate the Phantoms. One approach is to use the most significant bits (MSBs) to separate the program copies in the phantom space. For example, a Δ of 0x8000_0000_0000_0000 will create two phantoms on 64-bit systems, where each phantom resides in one half of the address space. In such embodiments, the most significant bit (MSB) determines whether the BBL belongs to the original domain, $C_O$, or the phantom domain, $C_P$. This approach is acceptable for 64-bit systems because VA allows for 64 bits, yet only 48 are used in practice, leaving the higher order bits available for phantom addresses. However, this is costly for 32-bit systems as it will reduce the effective range of addresses a program can use by half. Instead, to store the phantom index, n additional bits may be added to the hardware program counter, while maintaining the 32-bit virtual address space of the program. This allows PNS to generate $N=2^n$ phantoms. Specifically, the mapping function, $f$, sets the additional n bits at control-flow transitions to randomize the execution at runtime. For simplicity, the phantom offset can be set to $\Delta = 1 << 32$ and the minor security shift of any phantom to be a multiple of the phantom index (i.e., $\delta_p = p \times d$).

Another operational component included with PNS implementations is that of a hardware randomizer configured to randomly select, during runtime, between the Phantoms to effect program execution. For example, and as will be discussed in greater details below, some basic blocks will be executed from Original ($Phantom_0$), while other basic blocks will be executed from any other Phantom. Correctness is unaltered because all Phantoms provide the same functionality by construction (although have different address spaces). PNS can randomize program addresses at any level of granularity, ranging from individual instructions to entire programs. For the sake of illustration, the examples described herein will be presented in terms of basic blocks (BBL's). Finer granularities can be achieved, although there is no strong incentive due to lack of a strong security need. Thus, the basic block (BBL) is defined as a single entry, single exit region of code. Any instruction that changes the PC register (referred to by control-flow instructions, such as jmp, call, ret) terminates a BBL and starts a new one.

A further operational component of the PNS is that of a resolver. Accessing different instruction names at runtime incurs additional performance overheads as each name needs to be translated to a virtual address and then a physical one before usage. To mitigate this problem, the PNS uses the inverse mapping function $f^1$ to resolve the different Phantoms to their archetype basic block. By doing so, the processor backend continues to operate as if there is only one copy of the program in the phantom name space.

The PNS architecture is also configured to perform conceal operations. Normal programs push return addresses to the architectural stack to help return from non-leaf function calls. The attacker may learn the domain of execution (the Phantom index) by monitoring the stack contents at runtime using arbitrary memory disclosure vulnerabilities. Thus, to preserve name confusion, the execution domain of the instructions needs to be concealed. Attackers can be prevented from learning the execution domain in a number of ways. One way is to encrypt the return address with a secret key and only decrypt it upon function return. Another approach, which is key-less and has low overhead, is to split this information so that the public part is what is common between the phantom domains, and the private part that distinguishes the domains is hidden away without architectural access. The return addresses are split between the architectural stack and a new hardware structure, referred to as the Secret Domain Stack (SDS), which by construction is immutable to external writes. SDS achieves this goal by splitting the return address (32+n) bits into two parts; the n-bits, which represent the phantom index (p), and the lower 32 bits of the address, which encodes the security shift ($\delta$). With each function call instruction, the lower 32 bits of the return address are pushed to the architectural (software) stack, whereas the phantom index p is pushed onto the SDS. A ret instruction pops the most recent p from the top of SDS and concatenates it with the return address stored on the architectural stack in memory. While under attack, the return address on the architectural stack will be corrupted by the attacker. However, the attacker cannot access SDS so it cannot reliably adjust the malicious return address to correctly encode $\delta$, leading to an incorrect target address after PNS merges the malicious return address with the phantom index p from SDS.

The PNS implementations described herein allow for correct operation intended by the original program code from which the phantom variants are generated. Particularly, consider the structured programming theorem, in which a program is composed from any subset of the control structures that includes sequence, selection, iteration, and recursion. It can be shown that PNS does not affect the four structures. For simplicity, assume n=1, so that only two phantoms exist, namely, Original ($C_O$) or Phantom ($C_P$). First, the sequence structure represents a series of ordered statements or subroutines executed in sequence. PNS assures this property by executing the statements (instructions) of a BBL in the same domain of execution (either Original or Phantom). For handling the selection structure, assume that a program is represented by a binary tree with a branching factor of 2. Hence, two types of such trees are defined. Type I is the tree where nodes are represented by the BBLs of committed instructions. Type II is the tree where each node has the address of the first instruction in the executed BBL. The edges are given by the direction taken by the last instruction of each BBL. The root of the tree is the first instruction fetched from the_start( ) section of a binary (or the address of this instruction in the address-based tree). The leaf node is the last BBL of the program (or the address of this BBL in trees of Type II). In the case of PNS, every taken branch on the tree of Type I is the same as every taken branch on the tree of Type II, i.e., program functional decisions are not affected. However, the contents of the tree nodes in Type II trees would be different for each program execution, as each BBL will be fetched from either Original or Phantom domain, and addresses of these domains differ by the offset $\Delta$. In other words, after the branch is resolved to be taken or not taken, PNS operates on the outcome and randomly chooses the domain of execution for the next basic block. The above argument also applies for the Iteration control structure in which the same basic block is executed multiple times. PNS does not change the functionality of the basic block, however, each time the basic block is executed it will be executed in one of the phantom domains. The Recursion construct is similar to iterative loops and thus is guaranteed to be executed correctly with PNS. The same proof holds for n>1 by making the branching factor of the tree equals 2 n. From the user perspective, the program will produce the same result, since the order and flow of instructions has not changed (Type I trees are unique). However, from the perspective of an entity that observes only addresses, each execution of a program appears to be a different sequence of addresses since the addresses of individual basic blocks will be altered (Type II trees are not unique). This provides a substantial security benefit.

Figure 4:
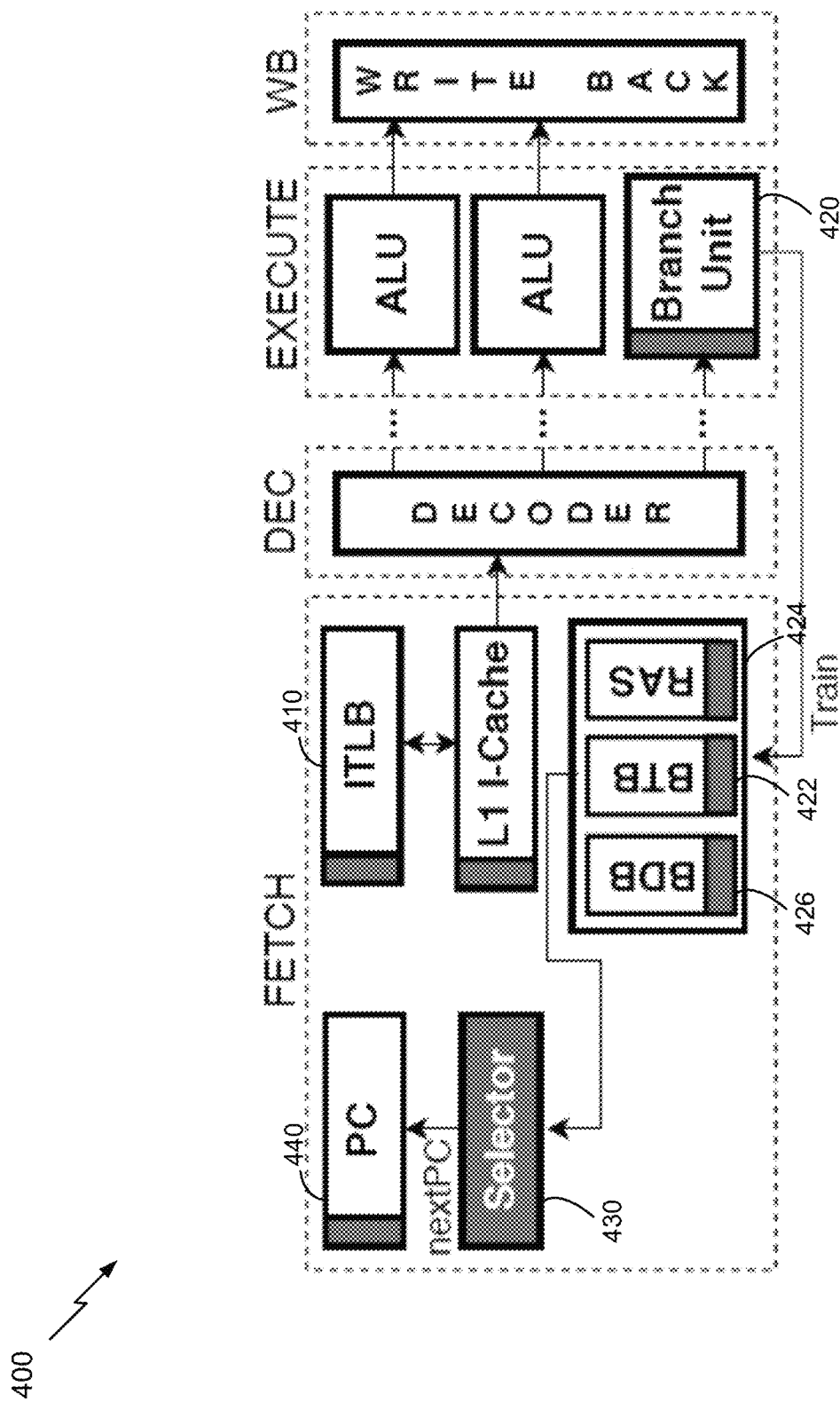
FIG. 4 is a schematic diagram of an example micro-architectural system to implement a phantom naming system.

With reference next to FIG. 4, a schematic diagram of an example micro-architectural system 400 to implement the PNS/PAS-based approaches described herein is shown. The microarchitecture implementation goal for NPS is to minimize the performance overheads related to executing multiple (2 or more) copies of the program while adding low storage overheads. One main reason for software-based Isomeron inefficiency is the large number of L1 instruction cache (L1-I$) misses. Creating two (or more) copies of the code sections for each program means that the L1-I$ capacity would be effectively reduced to one half. In contrast to data cache (D$) accesses, I$ accesses are serialized and cannot be overlapped. I$ misses prevent the flow of instructions through the processor and directly affect performance. To handle this issue, the two copies of the BBL's (which, as discussed herein, are slightly varied from each other to create variants of the original BBL) are created in virtual address (VA) space and not in physical address (PA) space.

Figure 5:
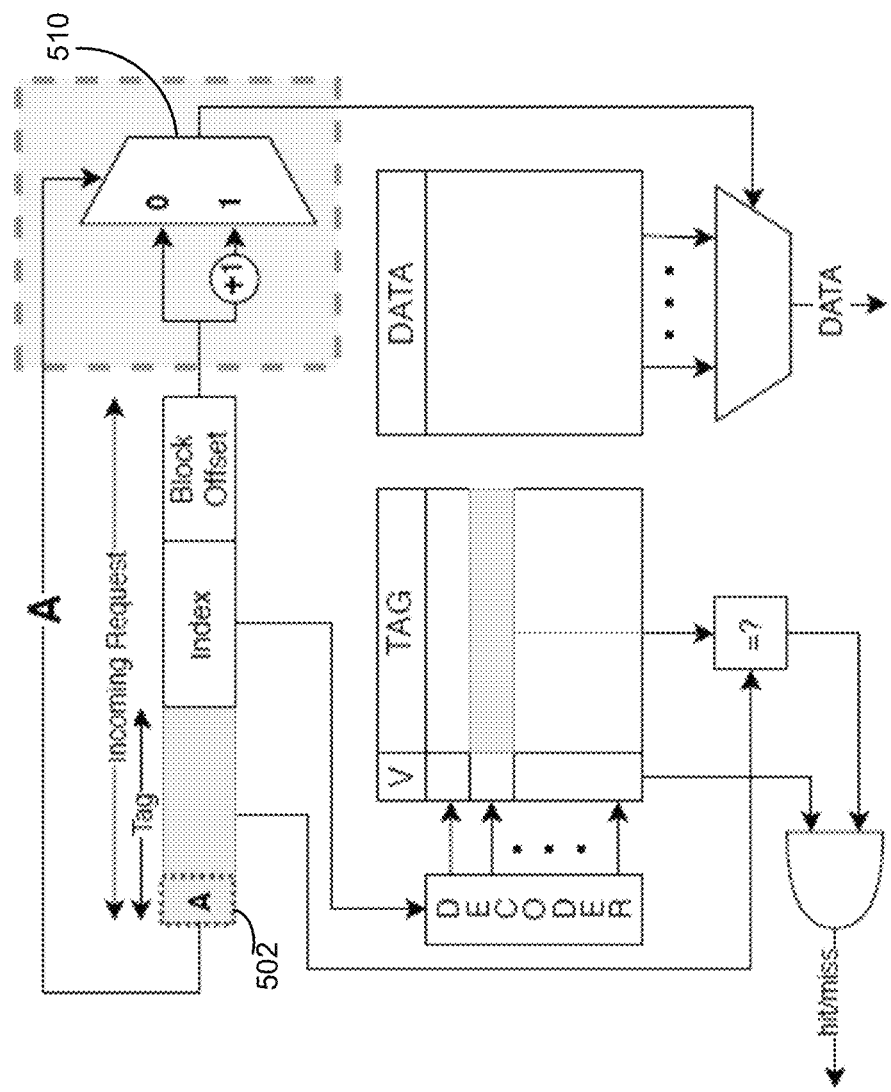
FIG. 5 is a diagram of an example instruction cache controller.

Since targeted programs are compiled as position independent code, the two phantom BBL's (e.g., Phantom$_0$ and Phantom$_1$ in FIG. 3) can be made identical except for their virtual memory addresses. If the L1-I$ is not aware of this fact, two copies of the BBL would be stored in two different cache lines (as they have different cache-line tags). This will reduce the L1-I$ capacity by one half. Thus, and with reference to FIG. 5, providing a diagram of an example instruction cache controller 500, two simple cache optimizations may be realized. First, the most significant bit is masked in the tag comparison (extracting the most significant bit, A, marked as box 502, of the incoming request). As a result, when the processor requests an instruction cache line (e.g., one that corresponds to either Phantom$_0$ or Phantom$_1$ of FIG. 3), it would be handled as a single request by the L1-I$. Second, a control circuit 510 increments the blkOffset by one if the MSB$_{req}$=1, and otherwise it retrieves the value corresponding to the unmodified blkOffset. The latency of an addition of one to the blkOffset can be hidden within the cache read operation. This shift of blkOffset by one ensures that while executing a BBL from a phantom address space, a TRAP instruction or an NOP instruction (further discussed below) is not executed. By adding the above optimizations, the I$ overheads of the NPS is reduced to the overheads of having one NOP instruction per BBL instead of two full BBLs in case of a software-based Isomeron.

Turning back to FIG. 4, with PNS, each PC is extended by (additional) n-bits, dubbed the phantom index (p). Thus, a program counter from phantom p will have the following format (for a 32-bit physical address space):

$PC_p[31+n: 0]=\{p[n-1:0], PC[31:0]\}$

As depicted in FIG. 4, a selector (S, also referred to as a Diversifier, or D) 430 is responsible for adjusting the PC before executing any new BBL so that the execution flow cannot be predicted by the attacker. Specifically, the selector 430 takes the predicted target for a branch ($PC_{new}$) with control-flow signal s as input, with s being set to '1' if the Branch Predictor Unit (BPU) has a predicted target for this instruction, or to '0' (zero) otherwise. The selector generates the nextPC as the output. If s equals '1', the selector generates (e.g., using, in some embodiments, n metastable flip-flops) an n-bit random phantom index $p_{next}$. Based on $p_{next}$, the selector 430 adjusts the nextPC according to, for example:

$nextPC[31+n: 0]=\{p_{next}[n-1:0], PC_{new}-(p_{next}-p_{new})\times\delta\}$

It is to be noted that $p_{new}$ is the phantom index of the predicted target PCnew. For example, assuming n=8-bits, there are $2^8$=256 phantoms. If $PC_{new}$ corresponds to the fifth phantom (i.e., $p_{new}$=5) and the selector 430 randomly chooses the eighth phantom (i.e., $p_{next}$=8), nextPC will equal $\{8, PC_{new}-3\delta\}$. On the other hand, if the selector 430 randomly chooses the second phantom (i.e., $p_{next}$=2), nextPC will equal $\{2, PC_{new}+3\delta\}$. Because the security shift $\delta$ is only used to break the overlapping between the names in different phantoms, it can be arbitrarily set to a single byte on CISC architectures or multiples of the instruction size on RISC architectures.

The selector 430 generally adds one cycle latency to the nextPC calculations in the fetch stage. To alleviate this, a performance optimization that may be implemented is to move the selector to the commit stage; placing the selector 430 at the commit stage allows to mask latency overheads needed for target address adjustments so that it does not affect performance. At the commit stage, the target of the branch instruction is known and sent back to the fetch stage to update (train) the BPU buffers. At this point, the selector 430 will adjust the target address by using $p_{next}$ as explained above, and update the BPU buffers with nextPC. This ensures that the next execution for this control-flow instruction will be random and unpredicted. To bootstrap the first execution of a control-flow instruction, consider the following two possible cases: correct and incorrect prediction. If the first occurrence of the control flow instruction is correctly predicted to be PC+4 (falling through), then the selector 430 will keep using the current domain of execution (unknown to the attacker) for the next BBL. If the first occurrence of the control-flow instruction is incorrectly predicted, it would be detected later on in the commit stage and the pipeline will be flushed. In this case, the selector 430 will adjust the resolved target address by using p (unknown to the attacker) and update the BPU buffers with nextPC.

Another micro-architecture structure that would be affected by the PNS implementations described herein is the branch prediction unit (BPU) 420. In general, branch prediction allows the processor to move on and fetch the next instruction from L1-I$ without waiting for the full resolution of the target address of a branch instruction. BPU 420 stores a record of previous target addresses. For example, the last encountered target address of a branch instruction is stored in a small buffer called the branch target buffer (BTB) 422, and the return address for the last call is stored in a fast hardware stack, called the return address stack (RAS) 424. Various processor implementations use a hardware RAS 424 to predict the target of return instructions. When a procedure call executes, the hardware pushes the address of the instruction that follows it into the top of the RAS 424 (this address is equal to the link register value stored in R14 in AArch32 state or X30 in AArch64 state). When a return instruction is decoded, the hardware pops the entry at the top of the RAS 424 and uses its value as the predicted target of the return. In most cases, the prediction is correct. The RAS 424 is an important component because the security of PNS depends on hiding the b value of the return address from the attacker by storing it in a hardware-based shadow stack. If the processor implements a RAS such as the RAS 424, PNS extends it by one bit to store the b value whenever a new address is pushed to the RAS. For processors that do not implement RAS, such a component would need to be added. However, a full RAS does not need to be implemented. Instead, a hardware stack of 1-bit width and n bits long is created. This can be realized using a hardware FIFO module. For example, the majority of ARM processors have an RAS (for example, Cortex-A32 and Cortex-A76).

For the current PC value, the BPU checks if the corresponding entry exists in the record of previous target addresses (i.e., in BTB 422). If so, the target address found in the record becomes the predicted target address. Otherwise, the next physical instruction is predicted (e.g., nextPC is incremented to PC+4, i.e., PC+instruction size). There are different approaches to obtain an accurate prediction. For example, two-level local-history predictors use a branch history table (BHT) and a pattern history table (PHT) to keep track of previous branch outcomes. If the predicted target address turns out to be incorrect later in the instruction pipeline, the processor re-fetches the instruction with the correct target address (available usually at the execute stage of the branch instruction) and nullifies the instructions fetched with the predicted target address.

Another performance enhancement that can be realized for the PNS is to have the PNS assign N different addresses for the same control-flow instruction. In this case, there will be multiple entries in the prediction tables for the same effective instruction; this reduces the capacity to $$\frac{100}{N}\%.$$

Figure 6:
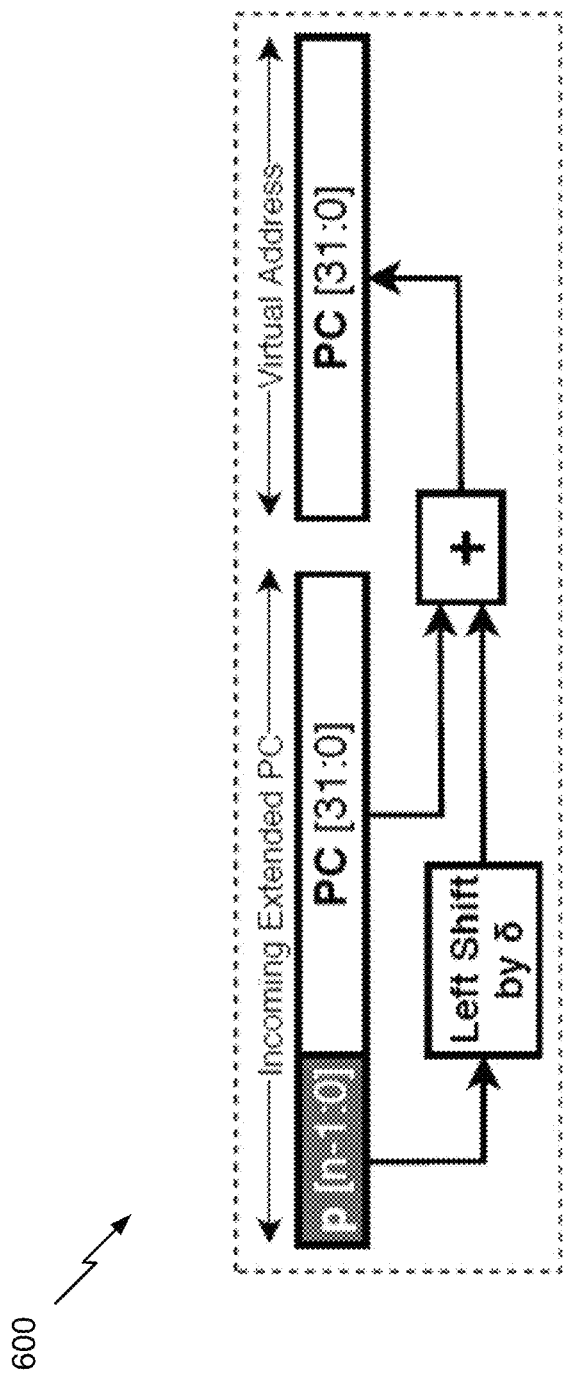
FIG. 6 is a diagram of a mapping circuitry to map the extended PC corresponding to the phantom name to a virtual address before indexing it into the micro-architectural structures.

To handle this issue, the incoming phantom address is mapped to its original name before indexing into the BPU tables, as shown in FIG. 6 (comprising a diagram of a mapping circuit 600 to map the extended PC, i.e., mapping the incoming phantom name, to the virtual address before indexing into the microarchitectural structures). This can be realized by modifying the hashing function of the BPU tables to avoid adding any latency to the lookup operation. This way phantom addresses (names) map to the same table entry. After indexing, the desired values can be obtained from the prediction tables. The nextPC values stored in the BTB are already chosen at random from the last successful commit of this control-flow instruction (or any of its phantoms). The branch direction prediction results (Taken vs. Not Taken) in the branch direction buffer (BDB) remain the same.

In some example implementations, phantom variants are generated based on the insertion of one or more instructions. One software modification that may be required is the insertion of a TRAP instruction (that can trigger a security exception) or an NOP instruction at the beginning of each BBL. These instructions are primarily inserted for security reasons as it ensures that the ROP gadgets do not exist at the same location (address offset) in the two copies (variants) of the code. Thus, this implementation neither requires access to source code of the target program, nor re-compilation. It can be fully implemented using a binary re-writer, allowing it to protect legacy code. Its simplicity allows for practical implementations with small overheads in storage and execution time, especially for 32-bit MCUs.

With continued reference to FIG. 4, another micro-architectural structure that is affected by the PNS implementations described herein is the translation look-aside buffer (TLB) 410. TLB 410 is a memory cache that is used to reduce the time taken to access a virtual address. The TLB 410 stores the recent translations of VAs to PAs. If the requested address is present in the TLB, a TLB hit occurs and the retrieved PA can be used to access memory. Otherwise, it is a TLB miss, and the translation proceeds by looking up the page table in a process called a page walk. After the PA is determined by the page walk, the VA-to-PA mapping is entered into the TLB. Similar to caches, TLBs may have multiple levels. Additionally, the processor can have separate ITLB and DTLB for instruction and data translations (FIG. 4 shows the TLB 410 as an instruction TLB), respectively.

Similar to the BPU buffers, the fact that there are N variants of every BBL with different virtual addresses may lead to multiple different virtual-to-physical address entries in the TLB for the same translation, reducing its capacity to $$\frac{100}{N}\%.$$

To avoid potential performance degradation, the incoming phantom address is mapped to its original name before accessing the ITLB. For example, the following two phantom addresses, {2, 0x00BB_FFF4} and {0, 0x00BB_FFF8}, will point to the same virtual address, 0x00BB_FFF8. This common virtual address has a unique mapping to a physical address, 0x0011 DDFC, that is stored in the ITLB. Thus, the translations related to all Phantoms map to a single entry in the ITLB, while the physical addresses are not modified so that the stored physical address part of the translation remains unaffected.

As noted, having two (or more) code variants could reduce the capacity of BHT, PHT, and BTB 322 by 50% as each basic block has two replicas so that the last branch of any BBL has two different PCs, PCO and PCV. To handle this issue, the hashing function that indexes those tables is modified to ignore the MSB, and to adjust the incoming PC by NOP size (when the PNS implementations generate different BBL variants by adding TRAP or NOP instructions). This way, both PCO and PCV can map to the same table entry. The branch direction prediction result (Taken vs. Not Taken), which, in some embodiments, is stored in a branch direction buffer (BDB) 326, should remain the same unless a more aggressive diversification mechanism is used to generate the second version of the binary. For example, instruction replacement that modifies branch instructions within the binary. On the other hand, branch target prediction would not be the same as there are now two valid potential targets for each PC, either targetPCO or targetPCV. In order to avoid increasing the size of the BTB 422 to include both targetPCO and targetPCV, BTB 422 is updated with the resolved and diversified target from the commit stage of the pipeline. This way, the next BBL will be randomly executed from $C_O$ or $C_P$.

Another optimization idea that can be applied to the PNS implementations described herein relates to the execution unit of the PNS. If the target architecture allows forwarding the PC register through the pipeline for regular instructions, the PC register is examined to ensure that it is mapped to the virtual address before operating on it. This mapping may introduce additional latency for the execute stage as it should be done before/after it. To mask such latencies, one solution is to always forward the two versions, Phantom p and Original, of the PC register to the desired execution units. Although such a solution completely hides the adjustment latency, it may increase the execution unit(s) area.

As noted, one further optimization concept that can applied to PNS relates to the secret domain stack. Particularly, instead of storing a complete version of the return addresses (e.g., 32-bit on AARCH32) in what is called a shadow stack, only a limited number of bits (e.g., n=8) per return address are stored. To minimize silicon area within the processor and facilitate managing the SDS, the full return address does not need to be stored. This structure does not introduce additional latency as it is accessed in parallel to the normal architectural stack access.

Similar to full shadow stacks, the OS needs to copy the active shadow stack upon fork system call to avoid a shadow stack violation when the new process returns from fork. The same should happen upon a context switch. In PNS implementations, the selector 430 may be implemented as part of the BPU 420. Once the BPU 420 generates the predicted newPC, it is used along with b to generate the nextPC value (stored in the PC 440), which should be used by the fetch stage.

Figure 8:
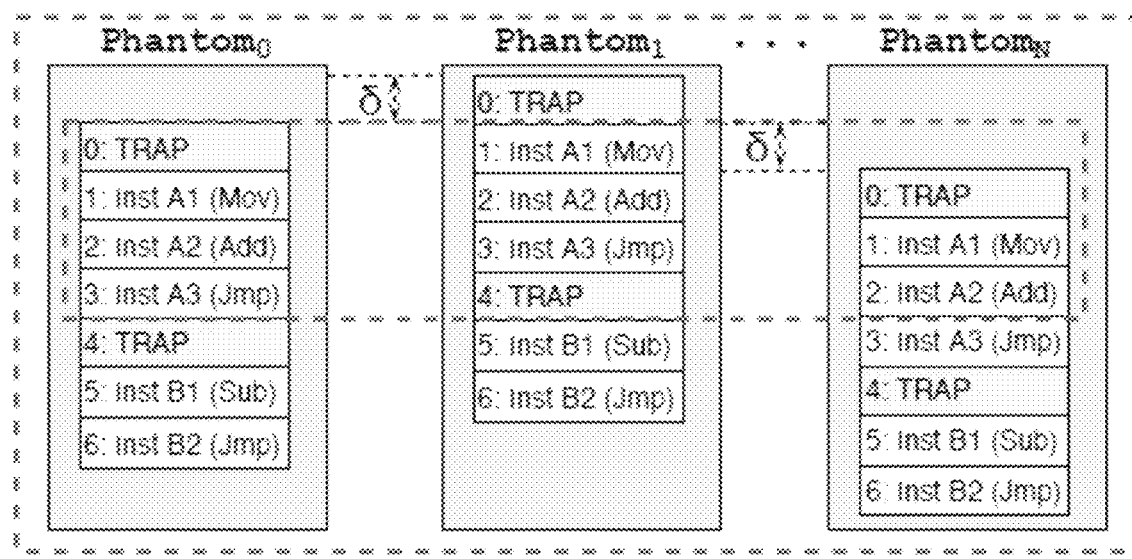
FIG. 8 is a diagram showing a PNS implementation with a TRAP instruction included in the various code block copies.

As noted, in some embodiments, to further limit the attack surface of PNS, TRAP instructions are added to the phantom copies of the BBL's. These instructions are inserted, in some examples, at the beginning of every basic block. While PNS is enabled, the security shift, δ, will cause the TRAP instruction that exists at the beginning of a BBL in the Original domain to appear at different locations of the same BBL in each of the Phantom domains, as shown in the diagram 800 of FIG. 8. This way, attackers that guess the incorrect diversification on the TRAP or NOP instruction while targeting BBL boundaries are discovered. Consider the example illustrated by the diagram 230 in FIG. 2. In that example, the attacker tries to divert the control flow to Inst 24 upon executing the ret instruction. In the scenario of the example of the diagram 230, a selector component (such as the selector 430 of FIG. 4) performs a randomization operation that cause the selection of the phantom domain to execute Inst 71. As a result, the attacker will step on the instruction that follows Inst 24 in the Phantom domain, which will be a NOP instruction in the new model. Executing the NOP (or TRAP) instruction could trigger a security exception and program termination, effectively thwarting the attacker. Programs generally do not execute NOP or TRAP instructions in normal conditions (no attack) as there exist no control-flow transfers to them.

Variants of code-reuse attacks rely extensively on pointer corruption (e.g., JOP/COOP) to subvert a program's intended control flow. There are various software-based mitigations for JOP/COOP-like attacks. Since an attacker needs to overwrite legitimate pointers used by indirect branches to launch the attack, one approach to prevent or inhibit such attacks is to encrypt the contents of the pointer upon creation and only decrypt it upon usage (at a call site). Consequently, attackers cannot correctly overwrite it. To achieve the above goal, a Lightweight Pointer Encryption (PtrEnc) scheme may be implemented to add two new instructions: ENCP and DECP. The two instructions can either be emitted by the compiler (if re-compiling the program is possible) or inserted by a binary rewriter. The Encrypt Pointer instruction (which can have the syntax of ENCP RegX) indicates an encryption instruction. RegX is the register containing the pointer, e.g., virtual function pointers. The register that holds the encryption key is generally hardware-based and should not appear in the program binary. The Decrypt Pointer (which can have the syntax DECP RegX) indicates a decryption instruction. Here too, RegX is the register containing the pointer. Again, the register that holds the decryption key would typically be hardware-based and should not appear in the program binary. As a result, the attacker cannot directly leak the key's value. Moreover, the attacker cannot simply use the new instructions as signing gadgets to encrypt/decrypt arbitrary pointers as they will have to hijack the control flow of the program first. Unlike prior pointer encryption solutions, which use weak XOR-based encryption, the PNS implementations described herein rely on strong cryptography (e.g., The QARMA Block Cipher Family). In contrast to full CCFI solutions, which use pointer authentication to protect all code pointers including return addresses, the approaches described herein guard pointer usages (loads and stores). Return addresses are handled by PNS randomization, reducing the overall performance overheads.

Some PNS implementations that include the addition of TRAP or NOP instructions require further modifications of the controller circuitry used to realize the phantom addressing approaches described herein. For example, the selector (diversifier) 430 of FIG. 4 needs to be configured to account for the inclusion of padding instructions (such as TRAP or NOP) in phantom variants of a code block. Consider, for the purpose of illustration, a selector, such as the selector 430 of FIG. 4, that is responsible for adjusting the program counter (PC) 440 before executing any new BBL so that the execution flow is unexpected to an attacker. Assume, for the purposes of the present example, that the PNS implements a 2-variant scheme in which the original domain has an NOP instruction added to the front of a phantom BBL, and the other phantom variant has an NOP instruction added to the back end of the phantom BBL. The selector may take the instruction opcode and resolved targets for a branch as inputs, and generate the newPC as the output. If the instruction is a control-flow instruction, the selector 430 flips a coin to generate a random value b (e.g., using a meta-stable flip flop). At the commit stage the target of the branch instruction is resolved, and the branch is committed. At this point the resolved target address is being send back to the fetch stage to update the Branch Prediction Unit (BPU) 420. Before it happens, the selector 430 will adjust the target address by using b. For example, if b=1 and domain of execution is $C_O$, then MSB of the target will be set to 1 and size of NOP instruction will be subtracted from it, so the next instruction will not be a NOP. This will ensure that the next prediction for this branch instruction will be random and unexpected to an attacker. It should be noted that each branch instruction executed for the first time has no prediction history in BPU. Thus, under those circumstances, for that one time only, the selector will continue in its original domain of execution.

However, after a first successful commit, the BPU will hold a target PC which will point to either $C_O$ or $C_P$ at random. Placement of the selector at commit stage allows hiding latency overheads needed for target addresses adjustments so it will not affect the performance. The adjustment of the branch target may be performed according to Table 1 below:

TABLE 1

| MSB(PC) | Selector output → b | NextPC |
|---|---|---|
| 0 | 0 | PC + size(NOP) |
| 0 | 1 | PC + Δ |
| 1 | 0 | PC − Δ + 2 · size(NOP) |
| 1 | 1 | PC − size(NOP) |

Figure 7:
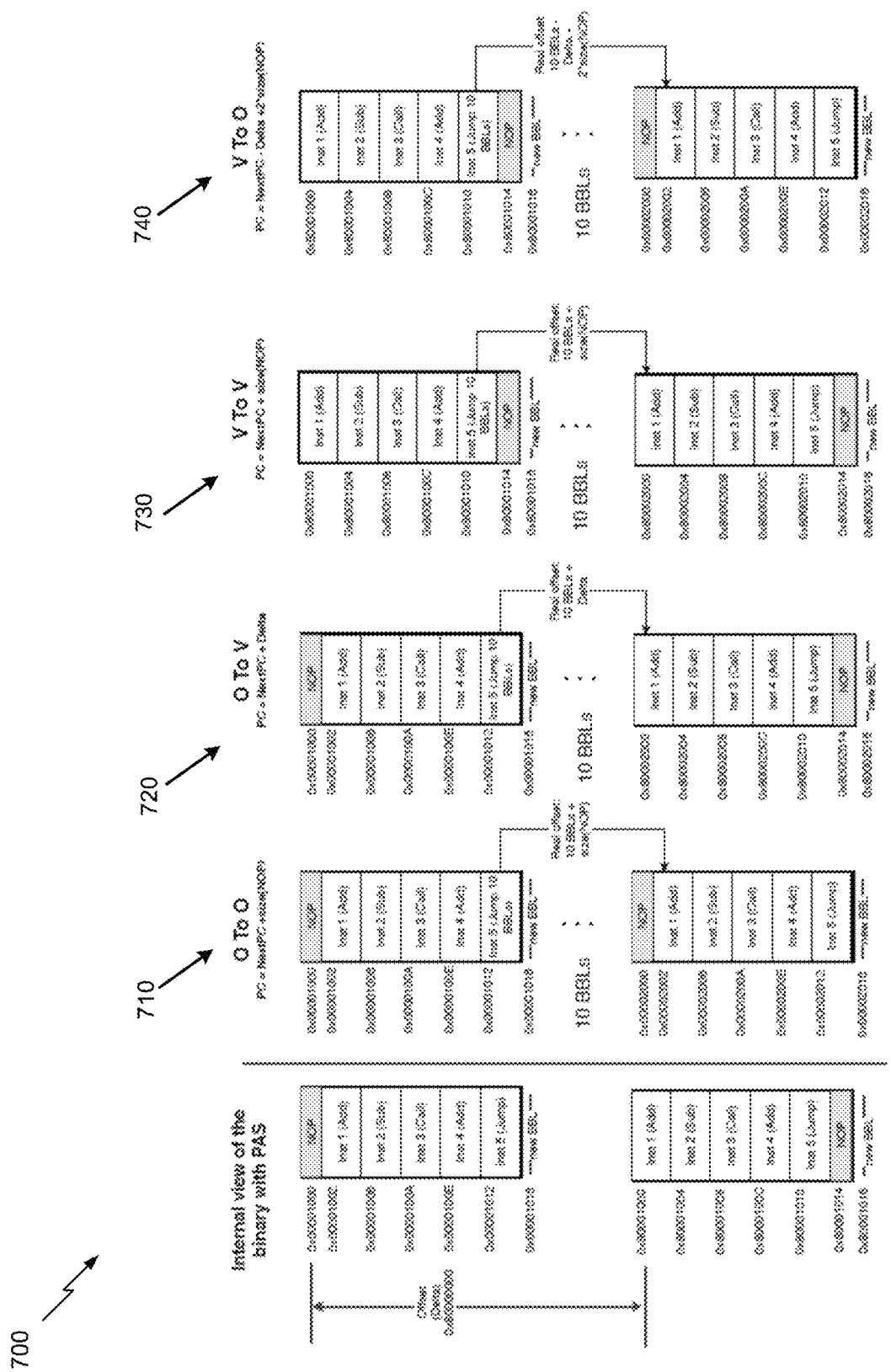
FIG. 7 includes diagrams illustrating example operations of an PNS system switching to different phantom domains based on a current state and a random decision made by a selector circuit.

FIG. 7 shows how the four cases from Table 1 are derived. At runtime, there are four different possibilities to switch between $BBL_{C_O}$ and $BBL_{C_P}$ based on the current state and a random decision made by the selector. As the program is compiled as PIC, there are no hard-coded addresses as part of the instructions, with the relative distance between the two BBL variants and the positions of the NOPs determining the correct PC. It is important that the PC should not point to an inserted NOP instruction during the program lifetime. In the first situation, illustrated by diagram 710, the current PC is pointing to the original variant (MBS is 0), and the diversifier generates an output of 0, indicating that the selected BBL would be in the original variant domain. Thus, because in this example the BBL's in the original variant execution domains are padded with an NOP instruction placed at the beginning of the BBL, the PC is computed as the sum of the nextPC (as derived, for example, by the branch prediction unit) and the size of the NOP instruction (i.e., the memory size needed to store an NOP instruction). In a second situation, illustrated by a diagram 720 shown in FIG. 7, the current execution domain is again the original variant domain, but the result of the diversifier indicates that the next BBL to be used is the phantom variant located in a separate part of the virtual address space. Thus, the resultant PC value will be the sum of the nextPC and the offset value (Δ) between the BBL in the original execution domain and its respective phantom variant in the phantom domain. Because, in the example of FIG. 7, NOP instructions are added to the end of the phantom variant BBLs, there is no intervening NOP instruction between the current, original domain, BBL and the next, phantom, BBL, and thus the size of the NOP instructions does not impact the program counter computation.

Turning now to the third illustration in FIG. 7 for moving between $BBL_{C_O}$ and $BBL_{C_P}$, diagram 730 shows the situation in which the current BBL is in the phantom execution domain, and the selector determines that the next BBL will also be in the virtual domain. Because the current size of the BBL in virtual memory is extended by one (1) NOP operation added to the end of the BBL (that operation does not exist in physical memory), the PC accounts for that added NOP instruction be subtracting a value equaling size (NOP) from the program counter value determined for the next BBL. Lastly, in the fourth illustration in FIG. 7, diagram 740 shows the situation in which the current BBL is in the virtual (phantom) execution domain, and the selector determines that the next BBL will be the one located in the original execution domain. Accordingly, to determine the correct PC values to use, a value equaling to the offset (Δ) between the original and phantom domain is subtracted from the PC value determined for the new BBL address (that BBL value was computed in the phantom domain, and therefore will correspond to the phantom variant address of the next BBL), and a value equaling twice the size of the NOP operation (corresponding to the NOP operation at the end of the current phantom BBL, and the NOP operation at the beginning of new BBL in the original execution domain) is added to the PC value being computed.

Figure 9:
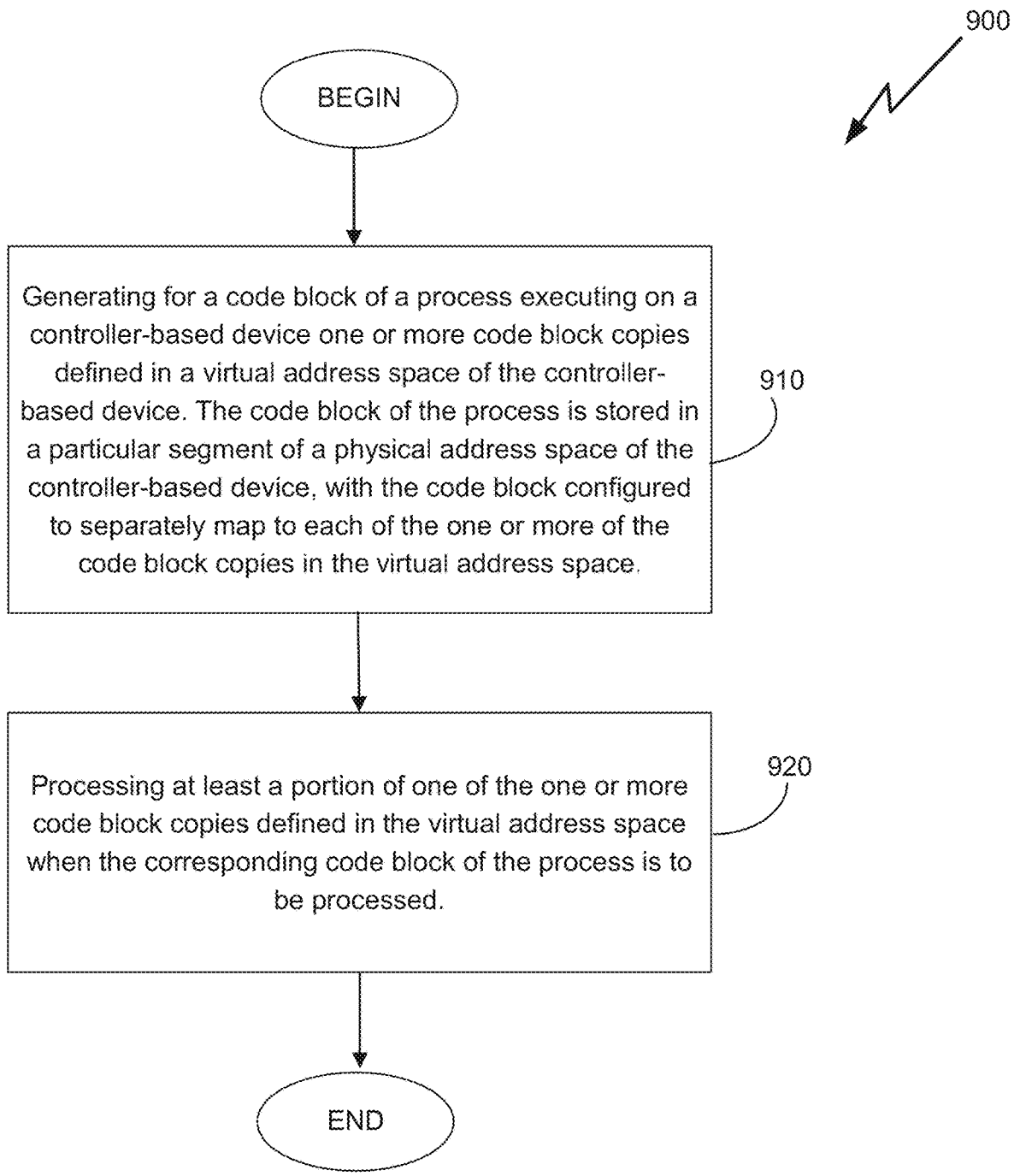
FIG. 9 is a flowchart of an example procedure to control execution of computer processes running on a phantom name system (PNS) implementations.

With reference next to FIG. 9, a flowchart of an example procedure 900 to control execution of computer processes running on a phantom name system (PNS) (such as the one implemented using the control circuitry of FIG. 4, that switches between phantom code variants in the manner depicted in FIGS. 2, 3, and 7) is shown. The procedure 900 includes generating 910 for a code block (e.g., the code block 340 of FIG. 3) of a process executing on a controller-based device one or more code block copies (e.g., the phantom copies Phantom$_0$ 310 and Phantom$_1$ 320) defined in a virtual address space of the controller-based device, with the code block of the process being stored in a particular segment of a physical address space of the controller-based device. The code block (in the physical space) is configured to separately map to each of the one or more of the code block copies in the virtual address space. The procedure 900 further includes processing 920 at least a portion of one of the one or more code block copies defined in the virtual address space when the corresponding code block of the process is to be processed.

In some examples, generating the one or more code block copies may include generating for the code block of the process executing on a controller-based device a plurality of code variants defined in the virtual address space of the controller-based device, with the code block being configured to separately map to each of the plurality of the code variants in the virtual address space, and processing the at least a portion of the one or more code block copies may include selecting for execution (e.g., using the selector 430 depicted in FIG. 4) one of the plurality of code variants when the corresponding code block of the process is to be processed. Selecting for execution one of the plurality of code variants may include randomly selecting for execution the one of the plurality of code variants.

In some examples, the procedure 900 may further include updating a program counter (e.g., the PC 440 of FIG. 4) of the controller-based device according to the randomly selected one of the plurality of code variants. Updating the program counter of the controller-based device may include determining a base virtual address corresponding to the code block of the process stored in the particular segment of a physical address space, determining a phantom index identifying the randomly selected one of the plurality of code variants, and computing a program counter value for the program counter according to the determined based virtual address corresponding to the code block stored in the particular segment of the physical address space and based on the determined phantom index.

Generating the plurality of code variants may include determining for each code variant a respective shift value ($\delta$) representing a relative shift of the location of the program instructions in the respective code variant compared to original locations of the original instructions of the code block, and defining the plurality of code variants in the virtual address space, with the first instruction of each variant located in the virtual address space at a corresponding virtual address space location computed according to a respective virtual address space offset ($\Delta$), and the respective determined shift value S. The procedure 900 may further include processing the selected one of the plurality of variants, including computing a return address for the one of the plurality of code variants in the virtual address space, storing one value derived from the return address in a software-implemented return address stack, and storing another value derived from the return address in a hardware-based structure that is immutable to external writes. In some examples, the return address may include a lower address portion including the respective shift value, $\delta$, and an upper address portion including a phantom index identifying the randomly selected one of the plurality of code variants. Storing the one value derived from the return address may include storing the lower address portion of the return address in the software-implemented return address stack, and storing the other value derived from the return address may include storing the upper address portion of the return address in a hardware-based secret domain stack (SDS) structure that is immutable to external writes.

In some embodiments, generating the plurality of code variants may include including for each variant from the plurality of code variants one or more padding instructions at corresponding one or more virtual address space locations. Including for the each variant the one or more padding instructions at the corresponding one or more virtual address space locations may include adding to the each variant of the plurality of code variants a TRAP instruction at a respective pre-determined one or more relative locations from the start of the each variant of the plurality of variants, with the TRAP instruction being configured, when executed, to trigger a security exception event.

Including for the each variant the one or more instructions at the corresponding one or more virtual address space locations may include adding to the each variant of the plurality of code variants a no-operation (NOP) instruction at a respective pre-determined one or more relative locations from the start of the each variant of the plurality of code variants in the virtual address space. The plurality of code variants includes at least two code variants, and the first of the at least two code variants may include a first NOP instruction at the beginning of the first of the at least two code variants, and a second of the at least two code variants may include a second NOP instruction at the end of the second of the at least two code variants.

The procedure 900 may further include storing in the physical address space locations for the corresponding code block, the NOP instruction at least at one of, for example, immediately before a physical starting address location of the code block, and/or immediately following a physical end address location of the code block.

Selecting one of the plurality of code variants may include accessing the code block from the physical address space based on a portion of a virtual address for one of the plurality of code of variants, the portion being indicative of the physical address space location, with portions of the virtual address indicating the virtual address space locations for the one of the plurality of code variants being masked.

In some examples, processing at least a portion of one of the one or more code block copies may include encrypting one or more pointers resulting from indirect program execution branching decisions, and decrypting the one or more pointers in response to a call operation requiring content of the one or more pointers.

Performing the various techniques and operations described herein may be facilitated by a controller system (e.g., a processor-based computing system). Such a controller system may include a processor-based device such as a personal computer, a specialized computing device, and so forth, that typically includes a central processor unit or a processing core. The CPU or processor may be one with electronic circuitry configured to perform one or more of the operations described herein. For example, the CPU may be one that includes a selector circuit (such as the selector 430 of FIG. 1). In addition to the CPU, the system includes main memory, cache memory and bus interface circuits. The processor-based device may include a mass storage element, such as a hard drive (solid state hard drive, or other types of hard drive), or flash drive associated with the computer system. The computing system may further include a keyboard, or keypad, or some other user input interface, and a monitor, e.g., an LCD (liquid crystal display) monitor, that may be placed where a user can access them. The computing system may be incorporated within a system to counter speculative adversarial attacks, as described herein.

The processor-based device is configured to facilitate, for example, the implementation of phantom address/name systems described herein. The storage device may thus include a computer program product that when executed on the processor-based device causes the processor-based device to perform operations to facilitate the implementation of procedures and operations described herein. The processor-based device may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), an ASIC (application-specific integrated circuit), a DSP processor, etc., may be used in the implementation of the computing system. Other modules that may be included with the processor-based device are speakers, a sound card, a pointing device, e.g., a mouse or a trackball, by which the user can provide input to the computing system. The processor-based device may include an operating system, e.g., Windows XP® Microsoft Corporation operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

To test and evaluate the performance of some of the implementations described herein, several studies, simulations, and experiments were conducted. The PNS implementations were tested on resource constrained devices, such as devices that use ARM ISA with its 32-bit ARMv5-8 instruction set architecture (ISA). However, the concept of PNS can be applied to any other ISA (e.g., RISC-V). More particularly, an example PNS implementation was realized in an out-of-order (OOO) CPU model of Gem5 for the ARM architecture. ARM32 binaries were executed from the SPEC CPU2017 C/C++ benchmark suite on a modified simulator in syscall emulation mode with the ex5_big configuration presented in Table 2, below, which is based on the ARM Cortex-A15 32-bit processor.

TABLE 2

| | Simulation parameters |
|---|---|
| Core | ARMv7a OoO core at 1.8 GHz; BPred: BiModeBP, 4096-entry BTB, 48-entry RAS; Fetch: 3 wide, 48-entry IQ; Issue: 8 wide, 60-entry ROB; Writeback: 8 wide, 16-entry LQ, 16-entry SQ. |
| L1 I-cache | 32KB, 2-way, 2 cycles, 64B blocks, LRU replacement, 2 MSHRs, no prefetch |
| L1 D-cache | 32KB, 2-way, 2 cycles, 64B blocks, LRU replacement, 16-entry write buffer, 6 MSHRs, no prefetch |
| L2 cache | 2MB, 16-way, 15 cycles, 64B blocks, LRU replacement, 8-entry write buffer, 16 MSHRs, stride prefetch |
| DRAM | LPDDR3, 1600 MHz, 1GB, 15 ns CAS latency and row precharge, 42 ns RAS latency |

To compile the benchmarks, a complete toolchain was built based on a modified Clang/LLVM v7.0.0 compiler including musl, compiler-rt, libunwind, libcxxabi, and libcxx. Using a full toolchain allows instrumenting all binary code, including shared libraries, and removing them from the trusted code base (TCB). In order to evaluate PNS, a modified toolchain was used to generate the following variants.

Baseline—This is the case of an unmodified unprotected machine. The SPEC CPU2017 benchmarks were compiled and run using an unmodified version of the toolchain and Gem5 simulator. In all experiments, the total number of cycles (numCycles) to complete the program, as reported by Gem5, was used to report performance. The numCycles values of the defenses are normalized to this baseline implementation without defenses. Thus, a normalized value greater than one indicates higher performance overheads.

PNS—In this scenario, unmodified binaries were run on the modified Gem5 implementation with all optimizations.

PNS-TRAP—In order to prepare PNS-TRAP binaries, an LLVM backend pass was implemented to insert TRAPs at the beginning of BBLs. This step can also be achieved with an appropriate binary rewriter making it compatible with legacy binaries. In the compiler pass, the PNS addresses translation function in Gem5 was modified to avoid executing the inserted TRAP instructions for normal program execution while resolving the BBLPhantoms correctly to a single BBL in the virtual address space.

PNS-PtrEncLite—To evaluate the performance of PNS with PtrEnc, an LLVM IR pass is first written to instrument the code (including shared libraries) and insert the relevant instructions as described in CCFI. Specifically, instructions are emitted whenever: (1) a new object is created (to encrypt the contents of the vptr), (2) a virtual function call is made (to decrypt the vptr), or (3) any operation on code pointers in C programs. Then, the encodings for ARM's ldc and stc instructions respectively, which are themselves unimplemented in Gem5, are appropriated to behave as ENCP and DECP instructions. A dedicated functional unit in Gem5 is added to handle these instructions' latency in order to avoid any contention on the regular functional units. Equal cycle counts of 8 for both instructions is assumed. This latency is to emulate the effect of the actual encryption/decryption.

PtrEncFull—In this approach, code pointer load/store operations are instrumented in addition to function entry/exit points to protect return addresses for non-leaf functions. Conceptually, this solution is similar to ARM PAC. However, due to the absence of PAC support in Gem5 (and for 32-bit ARM architectures in general), only behavioral simulation is performed for comparison purposes, without keeping track of the actual pointer metadata.

Naive Name Confusion (NNC)—For the sake of completeness and fair comparison, a static version was implemented where there are two copies of the code. In this model, there are two virtual addresses for each instruction, but these addresses are physically stored in memory, essentially halving the capacity of the microarchitectural structures. The two copies are created by introducing a shift of TRAP instruction size in one of them. At a high-level, the implementation works as follows: (1) clone functions using an LLVM IR pass, (2) LLVM backend pass to insert TRAPs for cloned functions, (3) instruct the LLVM backend to globalize BBL labels, (4) emit a diversifier BBL for every BBL, and (5) rewrite branch instruction targets to point to the diversifier.

Of the 16 C/C++ benchmarks, fourteen (14) compiled with all different toolchain modifications. 'parest' has compatibility issues with 'musl' due to exception handling usages, while 'povray' failed to run on Gem5. For NNC, gcc, xalancbmk, and x264 present compilation and/or linking issues.

Figure 10:
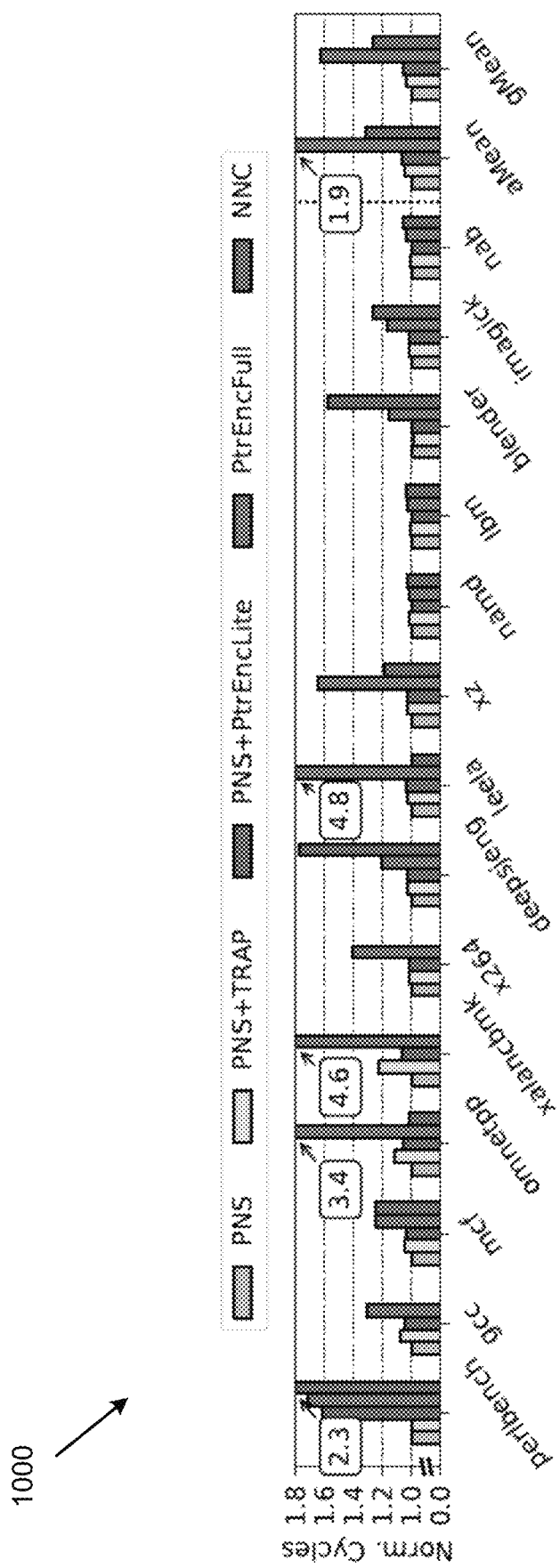
FIG. 10 is a graph showing results for PNS performance evaluation for SPEC2017 C/C++ benchmarks.

All benchmarks were run to completion with the test input set on the augmented Gem5. The correctness of the outputs were verified against the reference output. FIG. 10 includes a graph 1000 of the PNS performance evaluation for SPEC2017 C/C++ benchmarks. The graph 1000 shows the performance overhead of the different design approaches (all normalized to Baseline). As expected, PNS has identical performance to Baseline. The overhead of PNS-TRAP is minimal, 0%-22% (avg. 4%). Adding support for PtrEnc increases the performance overheads of PNS-PtrEncLite to 0%-61% (avg. 6%). The perlbench benchmark suffers from a relatively high overhead due to its extensive use of function pointers and indirect branches. On the other hand, fully protecting the binaries with a deterministic defense such as PtrEncFull encounters a 91% overhead on average (geometric mean of 62%). The static implementation of software NNC introduces an arithmetic average overhead of 31% (geometric mean of 26%). In contrast to software Isomeron which relies on dynamic binary instrumentation (DBI), the overheads for the implementations described herein are primarily attributed to the indirection every BBL branch must make to the selector (diversifier).

Figure 11:
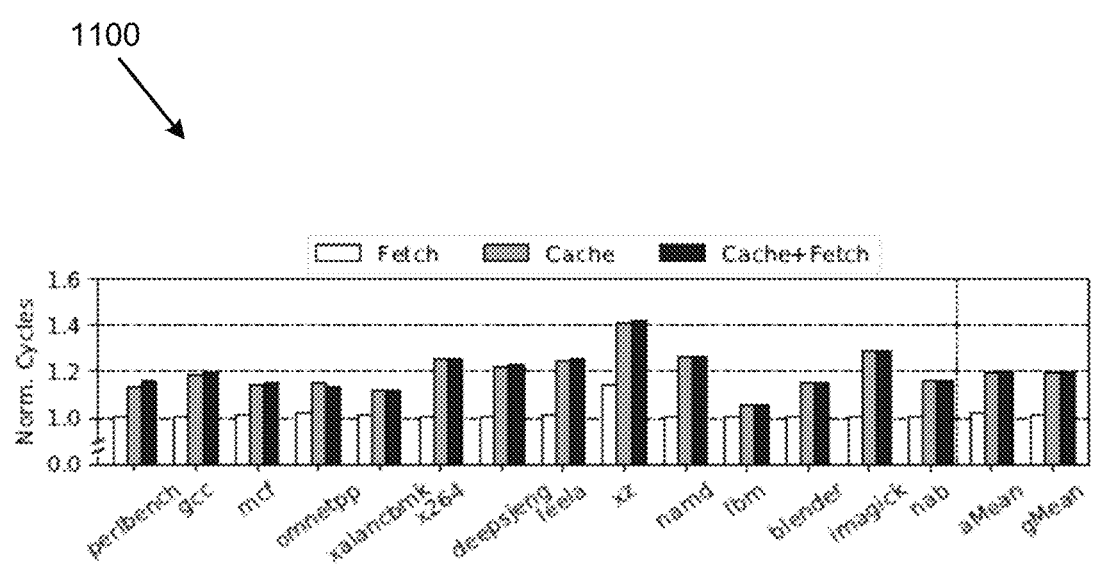
FIG. 11 includes a graph showing results for PNS performance evaluation with additional one-cycle access latency for fetch stage, for L1-I$, and for both.

The required PNS modifications do not add additional cycle latency to the processor pipeline. However, an additional set of experiments was performed with a more conservative assumption of having one additional cycle latency for all instructions in fetch stage, or one more cycle for accessing L1 instruction cache, or both. The results, compared to an unmodified baseline, are presented in FIG. 11, which includes a graph 1100 showing PNS performance evaluation result with additional one-cycle access latency for the fetch stage, the L1-I$, and for both. The performance results in FIG. 11 show an average performance overhead of 1% for stalling the fetch stage. However, stalling the instruction cache for one cycle (hit latency is originally two cycles) is more harmful to the performance. Thus, the I$ optimizations is desirable.

Finally, the call depths listed in Table 3 show that SPEC programs do not exceed a depth of 244 (for 'leela'), indicating that a 256-entry hardware Secret Domain Stack is sufficient to handle the common execution cases.

TABLE 3

Max. call depth for SPEC C/C++ benchmarks

| Bench. Name | Call Depth | Bench. Name | Call Depth | Bench. Name | Call Depth |
|---|---|---|---|---|---|
| perlbench | 24 | x264 | 15 | lbm | 10 |
| gcc | 28 | deepsjeng | 48 | blender | 23 |
| mcf | 28 | leela | 244 | imagick | 22 |
| omnetpp | 196 | xz | 16 | nab 1 | 6 |
| xalancbmk | 77 | namd | 12 | povray | — |

For the sake of completeness, an FPGA prototype of PNS was developed using the Bluespec hardware description language (HDL). Specifically, PNS hardware modifications were added to the front-end of the 32-bit Flute RISC-V processor, a 5-stage in-order pipelined processor typically used for low-end applications that need MMUs. The processor was prototyped on the Xilinx Zynq (ZCU106) Evaluation Kit. Evaluation results show that both the baseline core and the modified one can be reliably run with a clock period of 7.5 ns (maximum frequency of 133 MHz). The area increase due to PNS is negligible (0.83% extra Flip-Flops with 2.02% additional LUTs). The correctness of the FPGA implementation was verified by running simple bare-metal applications.

Next, evaluation results regarding the effectiveness of PNS and an analysis of PNS security guarantees against CRAs are presented. First, an analysis of the adversarial capabilities is provided. Consider an adversary model in which it is assumed that the adversary is aware of the applied defenses and has access to the source code, or binary image, of the target program. Furthermore, the target program suffers from memory safety-related vulnerabilities that allow the adversary to read from, and write to, arbitrary memory addresses. The attacker's objective is to (ab)use memory corruption and disclosure bugs, mount a code-reuse attack, and achieve privilege escalation. Assume also that the underlying OS is trusted. If the OS is compromised and the attacker has kernel privileges, the attacker can execute malicious code without making ROP-style attacks; a simple mapping of the data page as executable will suffice. Also assume that ASLR and WA protection are enabled—i.e., no code injection is allowed (non-executable data), and all code sections are nonwritable (immutable code). It is to be noted that other standard hardening features (e.g., stack-smashing protection, CFI) orthogonal to PNS (the proposed implementations do not require, nor preclude any such feature) may be deployed.

In the example PNS scheme discussed herein, no secret parameters were assumed. The number of phantoms and the security shift can be made public as security comes from the random selection of names. For PNS extensions, a per-process key (used for encryption) could be kept secret for the lifetime of the respective process.

To evaluate PNS against real-world ROP attacks, Ropper, a tool that can find gadgets and build ROP chains for a given binary, was used. A common ROP attack is to target the execve function with/bin/sh as an input to launch a shell. As the chain-creation functionality in Ropper is only available for x86, SPEC2017 x86 binaries are analyzed for this particular exploit and report the number of available gadget chains. To emulate the effect of PNS, the Ropper code was modified to extend each gadget length by one byte, decode the gadget, and check if the new gadget is semantically equivalent to the old one or not. This emulates the effect of an attacker targeting a particular address, but instead executing the one before due to the PNS security shift, δ. Table 4, below, presents ROP gadget-chain reduction results for SPEC2017 C/C++ benchmarks. In the table, PNS' and PNS correspond to the number of valid ROP chains before and after PNS. As shown in Table 4, PNS foils All the gadget-chains found by the modified Ropper. Intuitively, the results would be even worse for the attacker in ARM, as the state-space is more constrained due to instruction alignment requirements.

TABLE 4

| Bench. Name | PNS' Chains | PNS Chains | Bench. Name | PNS' Chains | PNS Chains | Bench. Name | PNS' Chains | PNS Chains |
| --- | --- | --- | --- | --- | --- | --- | --- | --- |
| perlbench | 17 | 0 | x264 | 23 | 0 | lbm | 23 | 0 |
| gcc | 23 | 0 | deepsjeng | 11 | 0 | blender | 23 | 0 |
| mcf | 11 | 0 | leela | 15 | 0 | imagick | 23 | 0 |
| omnetpp | 23 | 0 | xz | 11 | 0 | nab | 23 | 0 |
| xalancbmk | 15 | 0 | namd | 23 | 0 | povray | 23 | 0 |

Further evaluation of security was conducted using RIPE, which is an open source intrusion prevention benchmark suite. RIPE was ported to ARM and run it on the modified Gem5, with n=8 bits. The main focus of the analysis was on return-address manipulation as a target code pointer and ret2libc/ROP as attack payloads. The ported RIPE benchmark contains 54 (relevant) attack combinations. On an unprotected Gem5 system, 50 attacks succeeded, and 4 attacks failed. After deploying PNS, all of the 54 attacks failed including the single-gadget ret2libc attacks. The ability to thwart those attacks was mainly due to the high number of phantoms present at runtime ($2^8=256$). That said, real-world exploits typically involve payloads with several gadgets. The shortest gadget chain typically includes of thirteen gadgets. Hence, the probability for successful execution of a gadget chain is $$P_{success} \leq \left(\frac{1}{256}\right)^{13} = 4.93 \times 10^{32}.$$

Next, a qualitative security evaluation analysis is provided. Although Just-In-Time Return-Oriented Programming (JITROP) permits the attacker to construct a compatible code-reuse payload on the fly, it cannot modify the gadget chain after the control flow has been hijacked. As a result, the attacker needs to guess the domain of execution of the entire JIT-ROP gadget-chain in advance. So, PNS mitigates JITROP similarly to how it mitigates (static) ROP/JOP/COP, i.e., by removing the attacker's ability to put together (either in advance or on the fly) a valid code-reuse payload. The above security guarantees are achieved by the regular PNS proposal with no extensions or program recompilation, making it suitable for legacy binaries and shared third party libraries.

Blind Return-Oriented Programming (BROP) attacks can remotely find ROP gadgets, in network-facing applications, without prior knowledge of the target binary. The idea is to find enough gadgets to invoke the write system call through trial and error; then, the target binary can be copied from memory to the network to find more gadgets. With PNS, the success probability of invoking write would be $$\left(\frac{1}{256}\right)^5 = 9.09 \times 10^{13}.$$

Note that completing an end-to-end attack requires harvesting, and using, even more gadgets, after dumping the target binary, which makes the attack unfeasible on a PNS-hardened system. Additionally, BROP requires services that restart after a crash, while failed attempts will be noticeable to a system admin.

Unlike ROP attacks, which (re)use short instruction sequences, in Whole-function Reuse attacks entire functions are invoked to manipulate the control-flow of the program. This type of attack includes counterfeit object-oriented programming (COOP) attacks, in which whole C++ functions are invoked through code pointers in read-only memory, such as vtables. PNS relies on the PtrEnc extension to prevent the attacker from manipulating pointers (vptr) that point to Vtables (an important step for mounting a COOP attack). Ret2libc is another example for whole function reuse attacks, in which the attacker tries to execute entire libc functions. With PNS, the attacker will have to guess the address of the first basic block of the function in order to lunch the attack, reducing the success probability to $$\left(\frac{1}{256}\right) = 0.0039.$$

Analysis of real-world exploits shows that executing a ret2libc attack incurs multiple steps in order for the attacker to: (1) prepare the function arguments based on the calling convention, (2) jump to the desired function entry, (3) silence any side-effects that occur due to executing the whole function, and (4) reliably continue (or gracefully terminate) the victim program without noticeable crashes.

Steps (1) and (3) generally require code-reuse (ROP) gadgets. Thus, if the ROP part of the exploit requires G gadgets, the probability for successfully exploiting the program would exponentially decrease to $$P_{success} \leq \left(\frac{1}{256}\right)^G.$$

That is because the attacker will have to guess the domain of execution (out of $2^8$=256 phantoms) of every gadget.

One issue to consider is whether an attacker can leverage PNS's mechanisms to hijack the system. The answer is no for the following reasons. To divert the control flow of a program, an attacker must corrupt either (1) return addresses, which are protected with PNS randomization, or (2) function pointers, which are protected by the PtrEnc extension. To corrupt return addresses, an attacker must make a guess (this will exponentially scale with the number of return addresses to be corrupted) to determine the correct execution domain. To bypass PtrEnc, an attacker has to leak the key, which is hardware-based, or divert the control flow to a signing gadget (an encryption instruction). The latter requires hijacking the control-flow first, which is already guarded with randomization and encryption thus constructing a chicken and egg dilemma.

PNS also takes multiple steps to be resilient to side channel attacks. Firstly, PNS purposefully avoids timing variances introduced due to hardware modifications, in order to limit timing-based side channel attacks. Additionally, the attacker cannot leak the random phantom index, p, which are generated by the selector as it is unreadable from both user and kernel mode—it exists within the processor only. Similarly, the execution domain cannot be leaked to the attacker through the architectural stack, as PNS keeps it within the hardware in the secret domain stack (SDS).

For completeness, the following provides possible implementations changes that may be required to deploy a PNS general-purpose system. In terms of sizing, although SDS only stores eight bits per return address in hardware, it still has a limited size that cannot be dynamically increased as the architectural stack. This means programs with deeply nested function calls may result in a SDS overflow. To handle this issue, two new hardware exception signals are added: hardware-stack-overflow and hardware-stack-underflow. The former is raised when the SDS overflows. In this case, the OS (or another trusted entity), encrypts and copies the contents of the SDS to the kernel memory. This kernel memory location will be a stack of stacks and every time a stack is full it will be appended to the previous full stack. The second exception will be raised when the SDS is empty to decrypt and page-in the last saved full-stack from kernel memory.

Another possible implementation modification involves stack unwinding. Since addresses are split across the architectural (software) stack and the SDS, it is important to keep them in sync for correct operation. In some cases, however, the stack can be reset arbitrarily by setjmp/longjmp or C++ exception handling. To ensure the stack cannot be disclosed/manipulated maliciously during non-LIFO operations, the runtime is changed to encrypt the jmp_buffer before storing it to memory. Additionally, the current index of the SDS is stored. When a longjmp is executed, we decrypt the contents of the jmp_buffer is decrypted, and the decrypted SDS index is used to re-synchronize it with the architectural stack. The same approach can be applied to the C++ exception handling mechanism by instrumenting the appropriate APIs.

In some embodiments, the SDS of the current process is stored in the Process Control Block before a context switch. In terms of cost, the typical size of the SDS is 256-bytes (256 entries, each has 8-bits). Moving this number of bytes between the SDS and memory during context switch requires just a few load and store instructions, which consume a few cycles. This overhead is negligible with respect to the overhead of the rest of the context switch (which happens infrequently; every tens of milliseconds).

In some embodiments, to support multithreading, the SDS has to be extended with a multithreading context identifier, which increases the size of stack linearly with number of thread contexts that can be supported per hardware core. Dynamically-linked shared libraries are important to modern software as they reduce program size and improve locality. Although some embedded system software (the primary target in this work) in MCUs is typically statically linked, it is to be noted that PNS is compatible with shared libraries as it can be fully realized in hardware. Thus, it does not differentiate between BBLs related to the main program and the ones corresponding to shared libraries. On the other hand, dynamic linking has been a challenge for many CFI solutions, as control flow graph edges that span modules may be unavailable statically. CCFI suffers from the same limitation as the dynamically shared library code needs to be instrumented before execution; otherwise, the respective pages will be vulnerable to code pointer manipulation attacks.

Thus, described herein are phantom name/address systems to implement name confusion processes that allow for multiple addresses/names for individual instructions or blocks of instructions. The present disclosure also discusses an application of PNS, which is used to mitigate code-reuse attacks. A key idea is to force the attacker to carry out the difficult task of guessing which randomly-chosen name will be used, by the hardware, to carry out a successful attack. Building on this idea, it is shown that the implementations can protect against a wide variety of code-reuse attacks, including JIT-ROP and COOP attacks. While it offers strong security guarantees, in some implementations, PNS may require minor modifications to the processor front-end, including, for example, changing the indexing functions, adding metastable flip-flops and 256 bytes of state. Experimental results showed that PNS incurs negligible performance impact compared to, for example, hardware-based cryptographic control-flow integrity schemes. Another major benefit of PNS is that it does not depend on "free" bits or the vastness of the 64-bit address space to work, making it suitable for 16- and 32-bit microcontrollers and microprocessors. For the foreseeable future, code-reuse attacks will continue to plague systems security. The increased proliferation of resource-constrained systems that cannot deal with the performance overheads of server grade defenses calls for more efficient mitigations. PNS provides a cheaply deployable technique that strengthens control flow protection uniformly across embedded and server ecosystems.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:
    generating for a code block of a process executing on a controller-based device a code block replica defined at an address in a virtual address space of the controller-based device, wherein the code block of the process is stored in a particular segment of a physical address space of the controller-based device;
    generating multiple phantom address names that all map to the code block replica in the virtual address space, each of the multiple phantom address names having a phantom space address that is based on a respective phantom offset ($\Delta$) and a respective phantom security shift ($\delta$), wherein random selection of any of the generated multiple phantom address names causes runtime-determined program control flow that mitigates code-reuse attacks requiring predictable runtime program control flow; and
    for each group of one or more instructions, randomly selecting during runtime, when the code block of the process is to be processed, one of the multiple phantom address names based on which a program counter value is computed, wherein the randomly selected one of the multiple phantom address names is mapped into the code block replica in the virtual address space, with the code block replica to which the randomly selected one of the multiple phantom address names is mapped being subsequently translated to a physical address of the code block of the process;
    wherein generating the multiple phantom address names comprises generating a plurality of code variants for the code block, including:
        determining for each code variant the respective phantom security shift ($\delta$) representing a relative memory location shift for a particular one of the respective phantom address name from a memory address computed based on the respective phantom address offset ($\Delta$) for the particular one of the respective phantom address names; and
        generating the plurality of code variants in the phantom address space, with the first instruction of each variant located in the phantom address space at a corresponding phantom address space location computed according to the respective phantom offset ($\Delta$), and the respective determined phantom security shift $\delta$;
    and wherein randomly selecting one of the multiple phantom address names comprises randomly selecting for execution one of the plurality of code variants.

2. The method of claim 1, further comprising:
    updating a program counter of the controller-based device according to the randomly selected one of the multiple phantom address names.

3. The method of claim 2, wherein updating the program counter of the controller-based device comprises:
    determining a base virtual address corresponding to the code block of the process stored in the particular segment of a physical address space;
    determining a phantom index identifying the randomly selected one of the multiple phantom address names; and
    computing the program counter value for the program counter according to the determined base virtual address corresponding to the code block stored in the particular segment of the physical address space and based on the determined phantom index.

4. The method of claim 1, further comprising processing the selected one of the plurality of variants, including:
    computing a return address for the one of the plurality of code variants in the virtual address space;
    storing one value derived from the return address in a software-implemented return address stack; and
    storing another value derived from the return address in a hardware-based structure that is immutable to external writes.

5. The method of claim 4, wherein the return address comprises a lower address portion including the respective phantom security shift, $\delta$, and an upper address portion including a phantom index identifying the randomly selected one of the plurality of code variants;
    wherein storing the one value derived from the return address comprises storing the lower address portion of the return address in the software-implemented return address stack;
    and wherein storing the other value derived from the return address comprises storing the upper address portion of the return address in a hardware-based secret domain stack (SDS) structure that is immutable to external writes.

6. The method of claim 1, wherein generating the plurality of code variants comprises:
    including for each variant from the plurality of code variants one or more padding instructions at corresponding one or more virtual address space locations.

7. The method of claim 6, wherein including for the each variant the one or more padding instructions at the corresponding one or more virtual address space locations comprises:
adding to the each variant of the plurality of code variants a TRAP instruction at a respective pre-determined one or more relative locations from the start of the each variant of the plurality of variants, wherein the TRAP instruction is configured, when executed, to trigger a security exception event.

8. The method of claim 6, wherein including for the each variant the one or more instructions at the corresponding one or more virtual address space locations comprises:
adding to the each variant of the plurality of code variants a no-operation (NOP) instruction at a respective pre-determined one or more relative locations from the start of the each variant of the plurality of code variants in the virtual address space.

9. The method of claim 8, wherein the plurality of code variants includes at least two code variants, and wherein the first of the at least two code variants includes a first NOP instruction at the beginning of the first of the at least two code variants, and wherein a second of the at least two code variants includes a second NOP instruction at the end of the second of the at least two code variants.

10. The method of claim 8, further comprising:
storing the NOP instruction in the physical address space locations for the corresponding code block at least at one of: immediately before a physical starting address location of the code block, or immediately following a physical end address location of the code block.

11. The method of claim 1, wherein selecting one of the plurality of code variants comprises:
accessing the code block from the physical address space by masking a virtual address of the selected one of the plurality of code variants.

12. The method of claim 1, wherein randomly selecting one of the multiple phantom address names comprises processing at least a portion of a respective one of the multiple code blocks associated with the multiple phantom address names, including:
encrypting one or more pointers resulting from indirect program execution branching decisions; and
decrypting the one or more pointers in response to a call operation requiring content of the one or more pointers.

13. The method of claim 1, wherein the respective phantom offset (Δ) represents memory separation in a phantom address space between a first of the multiple phantom address names and another one of the multiple phantom address names, and wherein a respective phantom security shift (δ) represents a relative memory location shift for a particular one of the respective phantom address name from a memory address computed based on the respective phantom address offset for the particular one of the respective phantom address names.

14. A computing system comprising:
one or more memory devices to implement a physical address space for the computing system; and
a controller configured to:
generate for a code block of a process executing on the computing system a code block replica defined at an address in a virtual address space of the computing system, wherein the code block of the process is stored in a particular segment of the physical address space of the computing system;
generate multiple phantom address names that all map to the code block replica in the virtual address space, each of the multiple phantom address names having a phantom space address that is based on a respective phantom offset (Δ) and a respective phantom security shift (δ), wherein random selection of any of the generated multiple phantom address names causes runtime-determined program control flow that mitigates code-reuse attacks requiring predictable runtime program control flow; and
for each group of one or more instructions, randomly select during runtime, when the code block of the process is to be processed, one of the multiple phantom address names based on which a program counter value is computed, wherein the randomly selected one of the multiple phantom address names is mapped into the code block replica in the virtual address space, with the code block replica to which the randomly selected one of the multiple phantom address names is mapped being subsequently translated to a physical address of the code block of the process;
wherein the controller configured to generate the multiple phantom address names is configured to generate a plurality of code variants for the code block, including to:
determine for each code variant the respective phantom security shift (δ) representing a relative memory location shift for a particular one of the respective phantom address name from a memory address computed based on the respective phantom address offset (Δ) for the particular one of the respective phantom address names; and
generate the plurality of code variants in the phantom address space, with the first instruction of each variant located in the phantom address space at a corresponding phantom address space location computed according to the respective phantom offset (Δ), and the respective determined phantom security shift δ;
and wherein the computing system further comprises a selector circuit to randomly select for execution one of the plurality of code variants.

15. The computing system of claim 14, further comprising a program counter, wherein the controller is further configured to:
update the program counter according to the randomly selected one of the multiple phantom address names.

16. The computing system of claim 14, wherein the controller configured to generate the plurality of code variants is configured to:
include for each variant from the plurality of code variants one or more padding instructions at corresponding one or more virtual address space locations.

17. Non-transitory computer readable media comprising computer instructions executable on a processor-based device to:
generate for a code block of a process executing on a processor-based device a code block replica an address in a virtual address space of the processor-based device, wherein the code block of the process is stored in a particular segment of a physical address space of the processor-based device;
generate multiple phantom address names that all map to the code block replica in the virtual address space, each of the multiple phantom address names having a phantom space address that is based on a respective phantom offset (Δ) and a respective phantom security shift (δ), wherein random selection of any of the generated multiple phantom address names causes runtime-determined program control flow that mitigates code-reuse attacks requiring predictable runtime program control flow; and for each group of one or more instructions, randomly selecting during runtime, when the code block of the process is to be processed, one of the multiple phantom address names based on which the program counter value is computed, wherein the randomly selected one of the multiple phantom address names is mapped into the code block replica in the virtual address space, with the code block replica to which the randomly selected one of the multiple phantom address names is mapped being subsequently translated to a physical address of the code block of the process;

wherein the computer instructions to generate the multiple phantom address names comprise one or more instructions to generate a plurality of code variants for the code block, including to:

determine for each code variant the respective phantom security shift ($\delta$) representing a relative memory location shift for a particular one of the respective phantom address name from a memory address computed based on the respective phantom address offset ($\Delta$) for the particular one of the respective phantom address names; and generate the plurality of code variants in the phantom address space, with the first instruction of each variant located in the phantom address space at a corresponding phantom address space location computed according to the respective phantom offset ($\Delta$), and the respective determined phantom security shift $\delta$;

and wherein the computer instructions to randomly select one of the multiple phantom address names comprise additional one or more instructions to randomly select for execution one of the plurality of code variants.

* * * * *